United States Patent
Clare et al.

(10) Patent No.: US 6,237,211 B1
(45) Date of Patent: *May 29, 2001

(54) MODULAR FABRICATION AND ASSEMBLY METHOD FOR VEHICLE HIDDEN STORAGE SYSTEMS

(76) Inventors: Scott Clare, 3381 Shawn Court; Neil G. Long, 2630 Randall Way, both of Hayward, CA (US) 94541

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/183,851

(22) Filed: Oct. 30, 1998

Related U.S. Application Data

(63) Continuation-in-part of application No. 08/896,388, filed on Jul. 18, 1997, now Pat. No. 6,105,231, which is a continuation-in-part of application No. 08/685,678, filed on Jul. 24, 1996, now abandoned, which is a continuation-in-part of application No. 08/506,893, filed on Jul. 26, 1995, now Pat. No. 5,567,000.

(51) Int. Cl.[7] .................................................. B23P 11/00
(52) U.S. Cl. .......................... 29/434; 29/897.2; 29/401.1; 29/469; 296/37.6
(58) Field of Search .................................. 29/401.1, 434, 29/469, 897.2

(56) References Cited

U.S. PATENT DOCUMENTS

| | | | |
|---|---|---|---|
| 1,990,757 | * | 1/1935 | Stiles . |
| 2,380,557 | * | 7/1945 | Terry . |
| 2,426,772 | * | 9/1947 | Holan . |
| 2,455,417 | * | 12/1948 | Holan . |
| 2,616,754 | * | 11/1952 | Stahl . |
| 2,662,793 | * | 12/1953 | Lindsay . |
| 2,722,352 | * | 11/1955 | Dehnel . |
| 2,772,913 | * | 12/1956 | Holan . |
| 2,941,837 | * | 6/1960 | McCready . |
| 2,978,153 | * | 4/1961 | Brindle . |
| 3,034,823 | * | 5/1962 | Himka . |
| 3,068,038 | * | 12/1962 | Douglas . |
| 3,091,493 | * | 5/1963 | Rivers ................................ 296/183 |
| 3,245,713 | * | 4/1966 | Ogilvie . |
| 3,326,595 | * | 6/1967 | Ogilvie . |
| 3,541,668 | * | 11/1970 | Wessells et al. . |
| 4,135,761 | * | 1/1979 | Ward . |
| 4,422,685 | * | 12/1983 | Bonfilio et al. . |
| 4,789,195 | * | 12/1988 | Flecther . |

(List continued on next page.)

OTHER PUBLICATIONS

Sema Show Stopper: Trunks for Trucks; Kisiel, Ralph; Automotive News, Nov. 25, 1996.*

*Primary Examiner*—S. Thomas Hughes
*Assistant Examiner*—Steve Blount
(74) *Attorney, Agent, or Firm*—L. E. Carnahan

(57) ABSTRACT

A hidden storage system incorporated in the bed of a vehicle without altering the bed's external appearance or various contours thereof, and without revealing the storage system by assembly of modules containing various individual components. The storage system is located adjacent the wheel well sections of the bed, and uses hinges to open and close fender/side panel sections of the bed, either upwardly, downwardly or sideways. Since the storage system does not alter the truck's external appearance, it reduces the attraction for theft. Also, since the storage area does not extend inwardly beyond the conventional wheel wells, the storage system leaves most of the truck bed free for use. The hidden storage system may incorporated into the bed of various side panel configurations without detracting from the appearance of the side panels configurations.

28 Claims, 17 Drawing Sheets

U.S. PATENT DOCUMENTS

| | | | |
|---|---|---|---|
| 4,830,242 | * | 5/1989 | Painter . |
| 4,900,083 | * | 2/1990 | Kumasaka et al. . |
| 5,090,105 | * | 2/1992 | DeRees . |
| 5,267,773 | * | 12/1993 | Kalis, Jr. et al. ........... 296/37.6 |
| 5,303,969 | * | 4/1994 | Simnacher . |
| 5,316,358 | * | 5/1994 | Payne et al. . |
| 5,567,000 | * | 10/1996 | Clare . |
| 5,615,922 | * | 4/1997 | Blanchard . |
| 5,784,769 | * | 7/1998 | Clare et al. ........... 29/401.1 |
| 5,819,390 | * | 10/1998 | Clare . |
| 5,823,598 | * | 10/1998 | Clare . |
| 6,059,341 | * | 5/2000 | Jensen et al. ........... 296/37.6 |
| 6,105,231 | * | 8/2000 | Clare et al. ........... 29/434 |

* cited by examiner

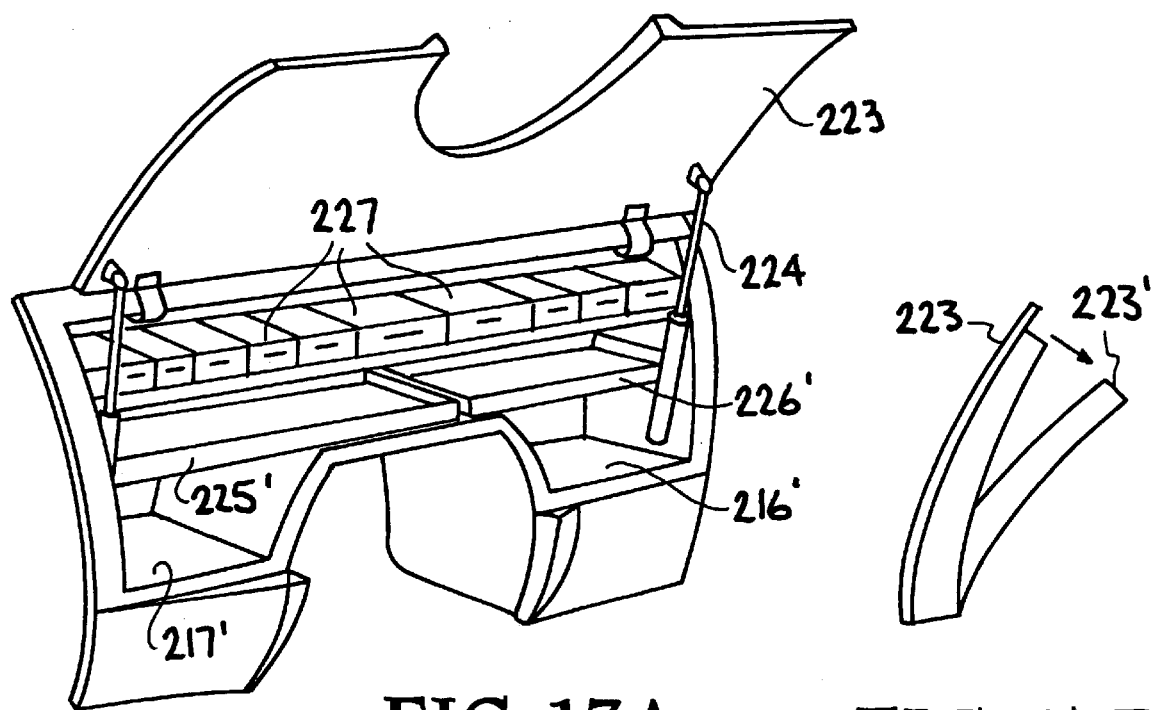
FIG. 17A  FIG. 17B
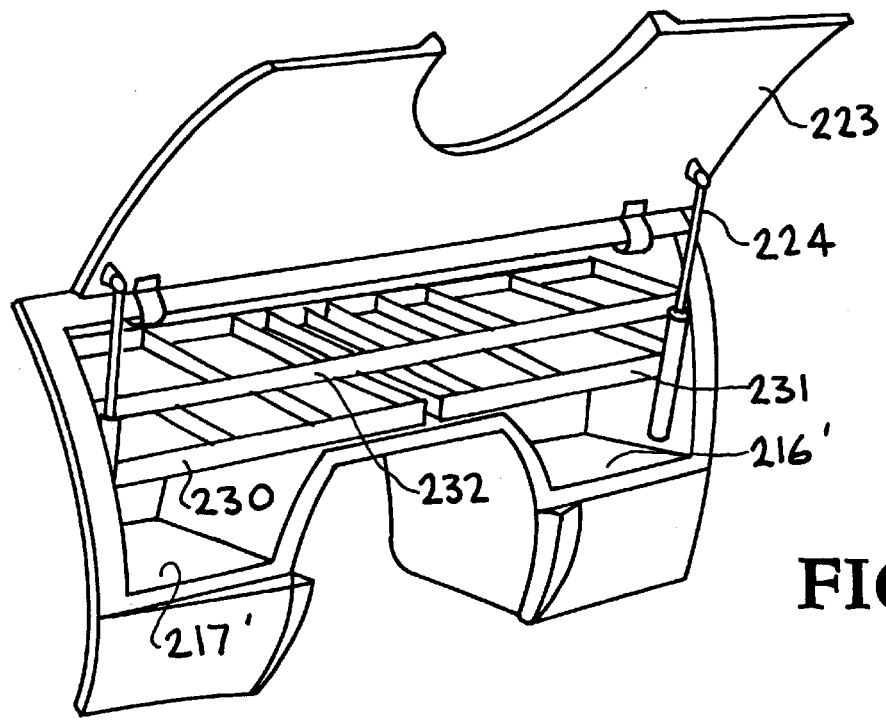
FIG. 18A

MODULAR FABRICATION AND ASSEMBLY METHOD FOR VEHICLE HIDDEN STORAGE SYSTEMS

Related Application

This application is a Continuation-In-Part of U.S. application Ser. No. 08/896,388 filed Jul. 18, 1997 now U.S. Pat. No. 6,105,231, which is a Continuation-In-Part of U.S. application Ser. No. 08/685,678 filed Jul. 24, 1996, now abandoned, which is a Continuation-In-Part of U.S. application Ser. No. 08/506,893 filed Jul. 26, 1995, now U.S. Pat. No. 5,567,000 issued Oct. 22, 1996.

BACKGROUND OF THE INVENTION

The present invention relates to hidden storage beds for vehicles, such as pickup trucks, particularly to a hidden storage bed assembly method for such vehicles, and more particularly to an improved modular fabrication and assembly method for vehicle hidden storage beds without substantially altering the external appearance of the beds.

Pickup and small trucks have long been a means for transporting and/or storing tools, materials, etc. for various trades, such as plumbing, electrical, construction, repair, etc. While conventional tool boxes, which generally extend across the pickup bed, are a convenient tool storage approach, such take up a great deal of space and thus reduce the carrying capacity. Also, the conventional pickup beds have been removed and replaced with utility type beds of various types, such as exemplified by U.S. Pat. No. 5,267,773 issued Dec. 7, 1993 to G. Kalis, Jr. et al, U.S. Pat. No. 3,245,713 issued Apr. 12, 1966 to D. A. Ogilvie, and U.S. Pat. No. 4,685,695 issued Aug. 11, 1987 to R. C. LeVee. In addition, the pickup truck body and/or beds have been modified to provide storage/utility space, such as exemplified by U.S. Pat. No. 4,917,430 issued Apr. 17, 1990 to M. A. Lawrence, and U.S. Pat. No. 3,727,971 issued Apr. 17, 1973 to M. L. Sisler.

While these prior storage/utility arrangements have been satisfactory for their intended purpose, such are an attraction for theft as well as having an appearance of a utility bed. Thus, there has been a need for a storage system for conventional (non-utility type) pickup truck beds which does not alter the bed's external appearance or significantly reduce the interior size of the bed, thereby reducing the tool theft problem while providing space for hidden storage without significant reduction of the bed's carrying capacity.

This need has been filled by the invention described and claimed in above-referenced U.S. Pat. No. 5,567,000, which involves the conversion or assembly of a conventional pickup truck bed into a hidden storage bed without altering the external appearance of the bed, and may also provide a complimentary design to the external appearance, i.e., bulged side panels, and without significant reduction in the carrying capacity thereof. This is accomplished by providing storage adjacent the wheel well area, and along the length of the bed, and providing the fender/side panel of the bed with a hinge and latch arrangement whereby the fender/side panel can be opened to expose the storage area, or closed and latched to conceal the storage area. Thus, the conventional pickup can be used for pleasure or work without the revealing of its storage/utility capability, and can be parked in areas where theft would likely occur from conventional tool boxes or utility beds. Also, U.S. Pat. No. 5,823,598 issued Oct. 20, 1998 describes and claims modifications of the hidden storage arrangement of above-referenced U.S. Pat. No. 5,567,000.

Methods have been developed for fabrication and assembly of the hidden storage beds, as well as for conversion of a conventional pickup bed, for example, into a hidden storage bed, and such methods have been described and claimed in U.S. Pat. No. 5,784,769 issued Jul. 28, 1998 and U.S. Pat. No. 5,819,390 issued Oct. 13, 1998. The present invention provides an improved method of fabricating and/or assembling the hidden storage beds, and involves a modular approach to both the fabrication of components and assembly of the bed. It has been found that certain of the individual bed components can be fabricated together forming a module, thus eliminating the assembly of these components, and that sections of the bed can be fabricated or preassembled into modular components, whereby final assembly of the hidden storage bed can be carried out by modular assembly, thereby reducing costs of fabrication and/or assembly of the bed components.

SUMMARY OF THE INVENTION

It is an object of the present invention to provide a hidden storage system for a bed, such as a conventional pickup truck bed, without substantially altering the external appearance of the bed.

A further object of the invention is to provide an improved method for fabricating components of a vehicle bed with a hidden storage system therein.

A further object of the invention is to provide an improved method for fabrication/assembly of a conventional type pickup truck bed with hidden storage capability and without a significant reduction in the carrying capacity thereof.

Another object of the invention is to provide a modular method for fabricating/assembling a vehicle bed with storage capability without substantially altering the external appearance of the bed.

Another object of the invention is to provide a modular fabrication and/or assembly method for a vehicle bed with a hidden storage system wherein at least portions of the side panels or fender/side panels of the bed are hinged to allow access to a storage area.

Another object of the invention is to reduce theft potential from a hidden storage bed of pickup trucks, etc. using a modular fabrication/assembly method to produce hidden storage areas in the bed without substantially altering the external appearance of the bed.

Other objects and advantages of the invention will become apparent from the following description and accompanying drawings. The invention involves a hidden storage system for conventional (non-utility type) vehicle beds, such as pickup truck beds, that can be installed in any fleetside, flareside, stepside, etc. bed, as well as beds using dual wheel housings, without substantially altering the bed's appearance. This vehicle bed may be mounted on any size truck frame up to and above the one-ton or king-cab type truck, as well as on trailers having side panels. The hidden storage system is installed in the wheel well area of the bed, and uses hinges to open and close at least sections of one or both of the side panels or fender/side panels of the bed. The side panels or one or both of the hinged sections of the fender/side panels are provided with a latching/lock mechanism. Since the hidden storage system only involves the area of bed adjacent the wheel wells, it does not significantly reduce the carrying capacity of the bed. The storage boxes for the system may extend over the wheel wells and down to the bed or may only cover the areas in front of, back of, or above the wheel wells, etc. By providing a hidden storage system for a pickup truck bed, the potential of theft therefrom is substantially reduced since the unaltered appearance of the bed's external surfaces would not lead one to a realization that it contained tools, etc. While the hidden storage system can be initially fabricated in the bed, such as on an assembly line, or existing beds can be converted to include the system as described in above-referenced U.S. Pat. Nos. 5,784,769, 5,823,598 and U.S. Pat. No. 5,819,390, the present invention provides a method by which individual components of the bed can be fabricated and/or assembled as modules, thereby simplifying the fabrication and assembly time and thus reducing the costs associated therewith.

BRIEF DESCRIPTION OF THE DRAWINGS

The accompanying drawings, which are incorporated into and form a part of the disclosure, illustrate an embodiment of the hidden storage system and fabrication/assembly methods for producing the system and, together with the description, serve to explain the principles of the invention.

FIGS. 16 and 17A–17B illustrate side views of an embodiment of a hidden storage system similar to FIGS. 1–2 with the hinged side panel open to illustrate a modular storage configuration that can be incorporated therein, a similar modular configuration being illustrated in FIG. 17, which includes at least one storage pocket in the hinged side panel as shown in FIG. 17B.

FIGS. 18–22 each illustrate different modular storage configurations which can be attached to the basic hidden storage bed structural components,such as shown in FIGS. 14 and 15.

DETAILED DESCRIPTION OF THE INVENTION

The present invention involves the fabrication of a hidden storage system for a pickup truck bed, for example, and involves a method for fabricating a bed to include the hidden system without increasing the width of the bed or substantially altering the external appearance of the bed, and without a significant reduction in the carrying capacity of the bed. The storage system may be fabricated from various materials including metals, fiberglass, reinforced plastics, molded compounds, and combinations thereof. While the invention is illustrated and described for fleetside or stepside versions of a pickup bed, it can be installed in any type of bed having available space, and can be installed on larger (one-ton) as well as king-cab vehicles, dual wheel pickup beds, and trailers having side panels. The present invention provides an integral hidden trunk, reduces the theft potential from storage/utility beds while maintaining vehicle appearance and increasing safety of the vehicle by hiding valued items therein. The invention utilizes lost space adjacent the wheel wells of the bed while maintaining the space between the wheel wells. As known, the space between the wheel wells of a conventional pickup truck bed is, for example, about four (4) feet and the conventional pickup truck beds have a length of up to eight (8) feet plus, wherein sheets of 8 ft. by 4 ft. material, such as plywood, etc. can be carried between the wheel wells, and camper shells, etc. can be positioned in the bed. Also, the invention utilizes lost space in conventional small or mid-size pickup beds with less than four foot width between wheel wells and less than eight foot length, and maintains the space between the wheel wells. However, the space in front and back of the wheel wells is generally considered lost space for large items until material has been stacked above the height of the wheel wells. Thus, by utilizing the area in front and/or back, and above the wheel wells as hidden storage space, the overall storage/carrying capacity of the bed is increased between the outer fender and inner fender of a stock pickup by removing the inner fender. Here, the term storage space is defined as that space in which tools, such as vices, saws, parts, etc. can be stored or mounted for use, and in which shelves can be secured for retaining such tools or parts, etc. Also, due to the length of a conventional pickup side panels, the storage area can be used for skis, golf clubs, fishing equipment, sporting goods, etc. The hinged side panels may be released similar to a car trunk release by either mechanical or electrical (remote) control. The hidden storage system may be incorporated only in front of, in back of, or over the wheel well.

Figure 5:
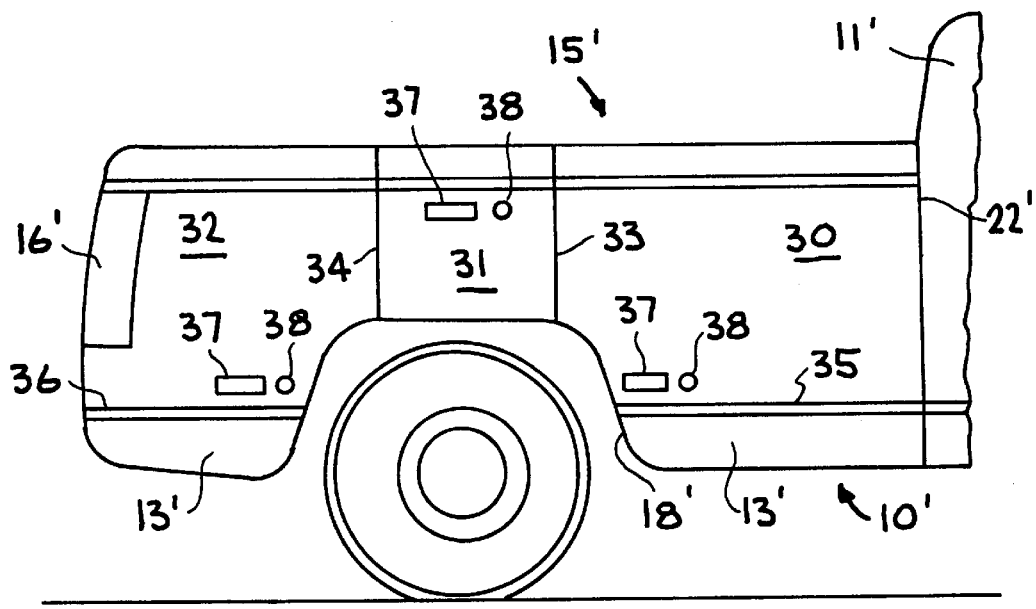
FIG. 5 is a side view of a conventional pickup truck bed incorporating the hidden storage system as in the FIGS. 1–2 embodiment except that the side panel includes three hinged sections.

By the present invention, a conventional pickup truck bed, for example, is initially fabricated to be a hidden storage bed, whereas the installation of prior known storage/utility type beds involve the replacement of the conventional bed. Also, the cost of conversion to a hidden storage bed compared the cost of the conventional bed replacement may be substantially less. Upon completion of the hidden storage system, either by initial modular fabrication/assembly or by conversion, from a side view, the only difference between the hidden storage bed and a conventional bed are one or more vertical lines or small spaces where the side panel is cut, as illustrated in FIG. 5, for example. The hinge or hinges for side panel sections are located on an inner area of the side panel so as not to be exposed to one viewing the bed from an external side position. Thus, one would not readily recognize the modification to the bed, and therefore those with intent to steal tools, etc. would not recognize the hidden storage arrangement.

The hidden storage system can be initially fabricated from various types of materials, as in an assembly line arrangement, wherein the various parts are initially fabricated, then assembled and painted as the bed passes from station to station along an assembly line. Also, in accordance with the present invention, the fabrication and/or assembly of the bed can be carried out using modules or sub-assemblies containing various components of the bed. The bed and the hidden storage system may be fabricated from various suitable materials including metals, fiberglass, molded composites, plastics, etc.

Figure 1:
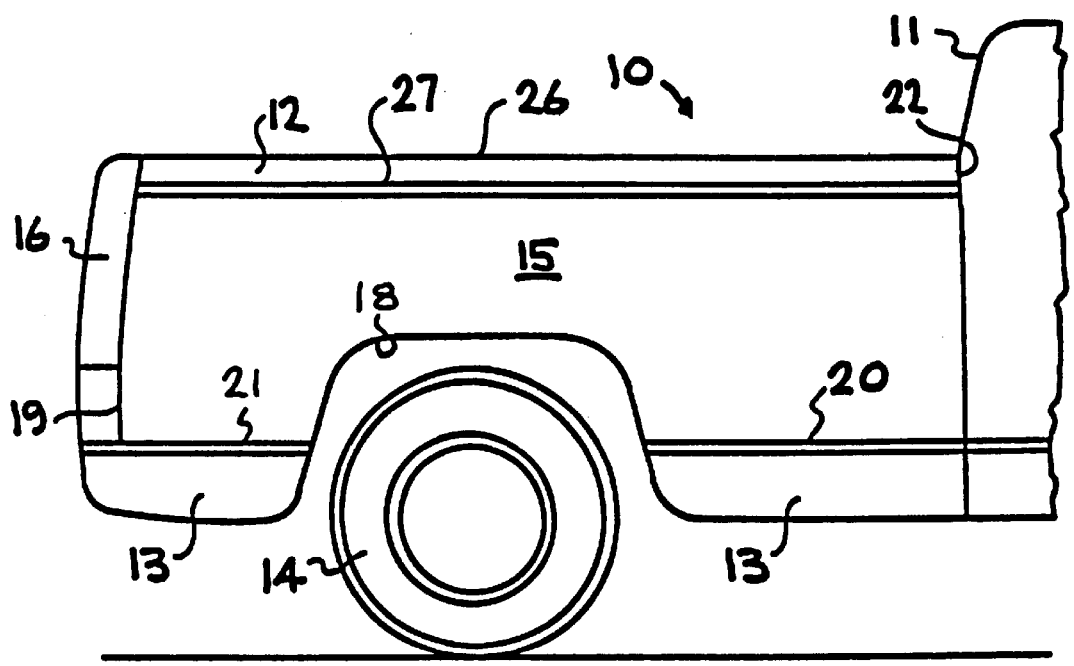
FIG. 1 is a view of a side of a conventional pickup truck bed which has been modified to incorporate the storage system under the closed fender/side panel of the bed in accordance with the present invention.
Figure 2:
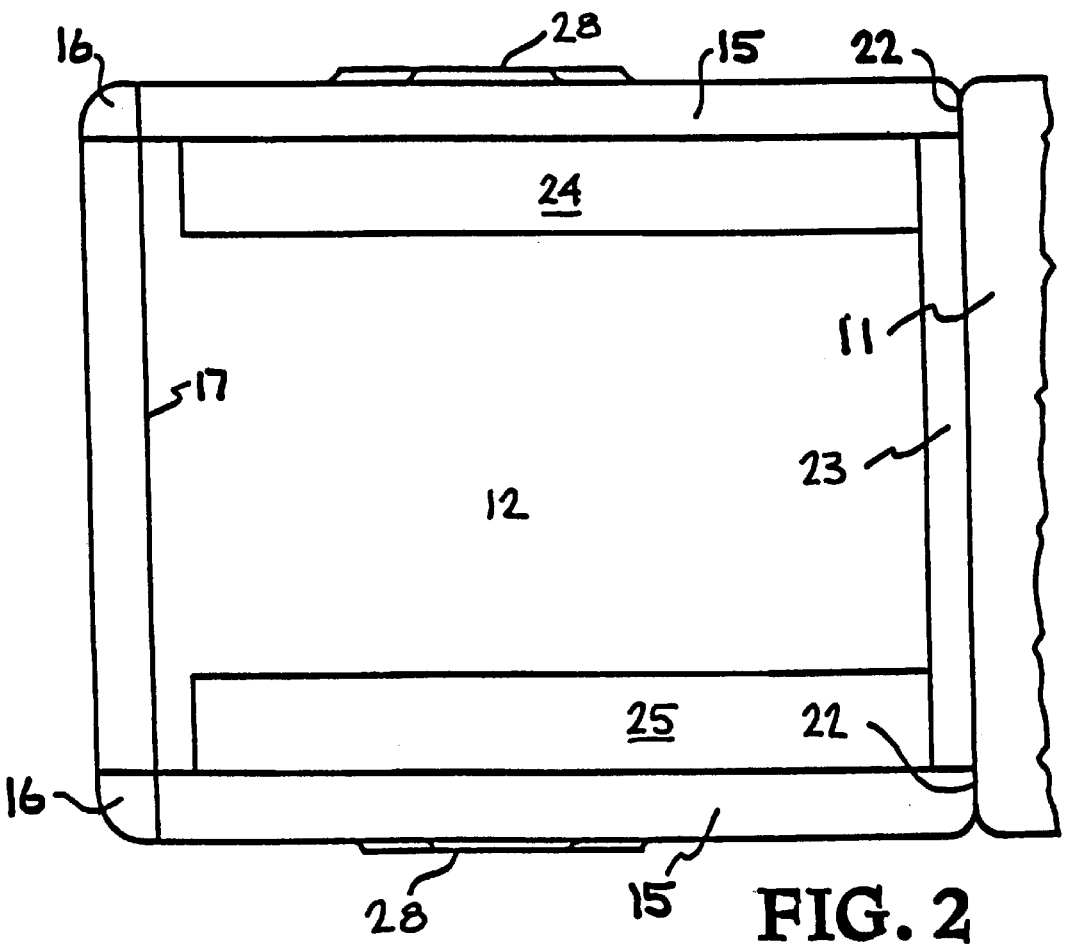
FIG. 2 is a top view of the FIG. 1 pickup truck bed illustrating the storage boxes and fender/side panels, with the tail gate closed.

Referring now to the drawings, FIGS. 1 and 2 illustrate a conventional appearing pickup truck generally indicated at 10 having a cab 11, bed 12, frame or undercarriage 13 and includes hinged side panels 15, a tail light arrangement 16, a hinged tail gate 17 and wheel wells 18. However, the bed 12 of FIGS. 1 and 2 has been modified in accordance with the present invention, with the only indication of such modification being the cut, small space, or lines 19 in the side panels 15 below tail light 16, as shown in FIG. 1, with the side panel being closed. Note that in this embodiment the hinged side panels 15 terminate adjacent sections of the side panel secured to the frame or undercarriage 13 as indicated by the lines 20 and 21, and the front edges of the hinged bed side panels are indicated at 22, where the side panels 15 contact a front panel or bulkhead 23 of the bed 12.

Figure 8:
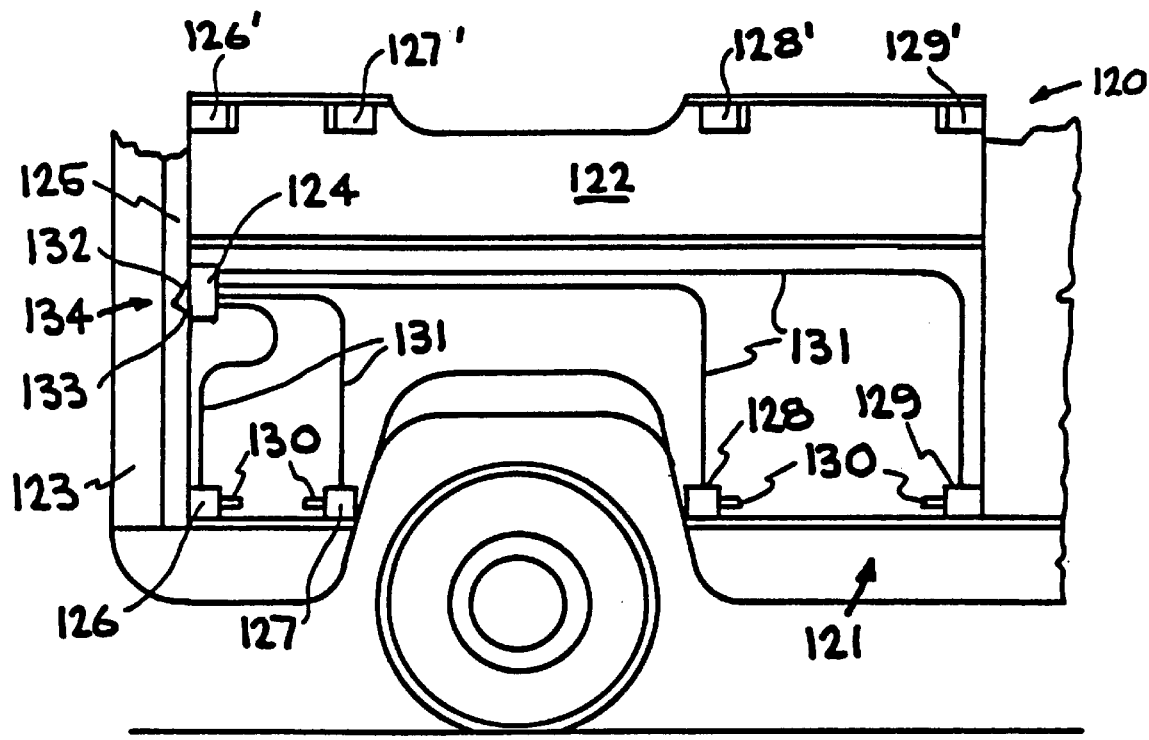
FIGS. 8 and 9 illustrate mechanical and electrical lock/latch mechanisms or securing the hinged side panels, such as those shown in FIGS. 1–2 ad 16.
Figure 9:
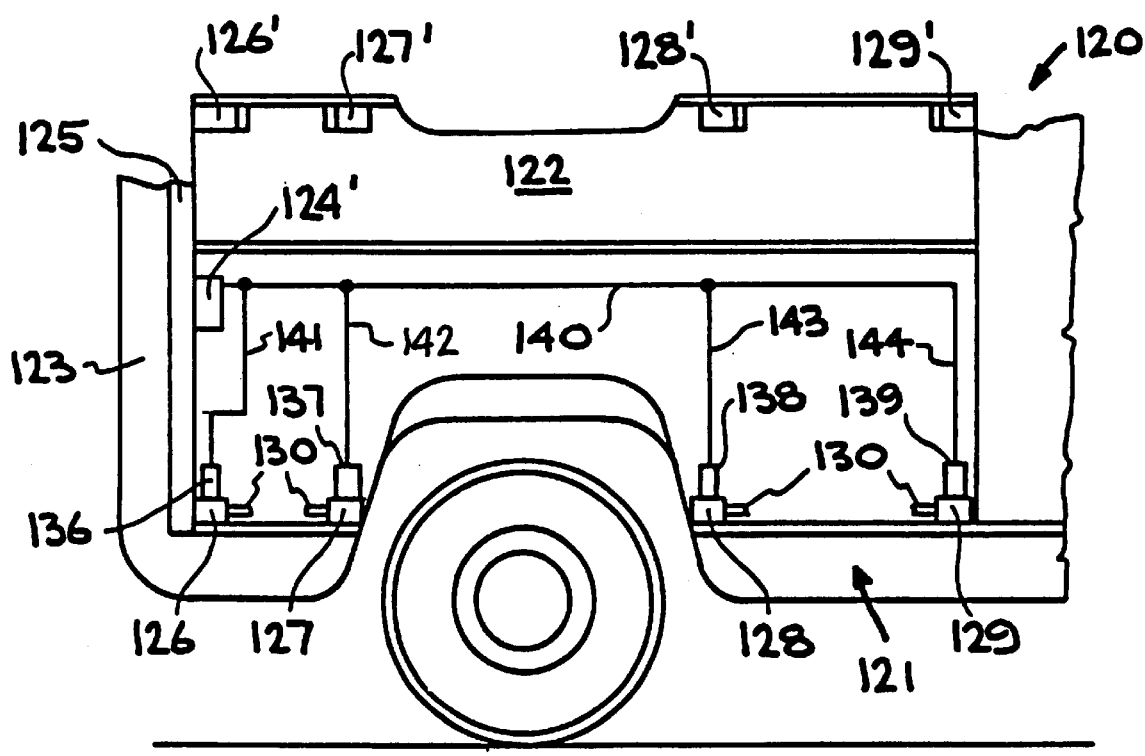

As seen in FIG. 2, the hidden storage area does not increase the width of the bed and is provided by storage or structure boxes 24 and 25 mounted within the bed 12 and forward, rearward and over the wheel wells 18, the boxes 24 and 25 being constructed to cover the wheel wells 18, but not extend to the top or upper surface 26 of bed 12 so as not to be seen from an external view, and terminate in spaced relation to tail gate 17. The top of the storage boxes extend along the bed at a height equal to line 27 in FIG. 1. Side panels 15 include a fender section 28. A lock mechanism is mounted in the rear of each of boxes 24 and 25 and activates latch mechanisms which include latch members located in spaced relation along the bed 12, and which cooperate with corresponding latch members in side panel 15, as shown in FIGS. 8 and 9. As seen in FIG. 8, the latch members are interconnected by a cable which is connected to the lock mechanism, or are connected electrically as shown in FIG. 9.

Figure 3:
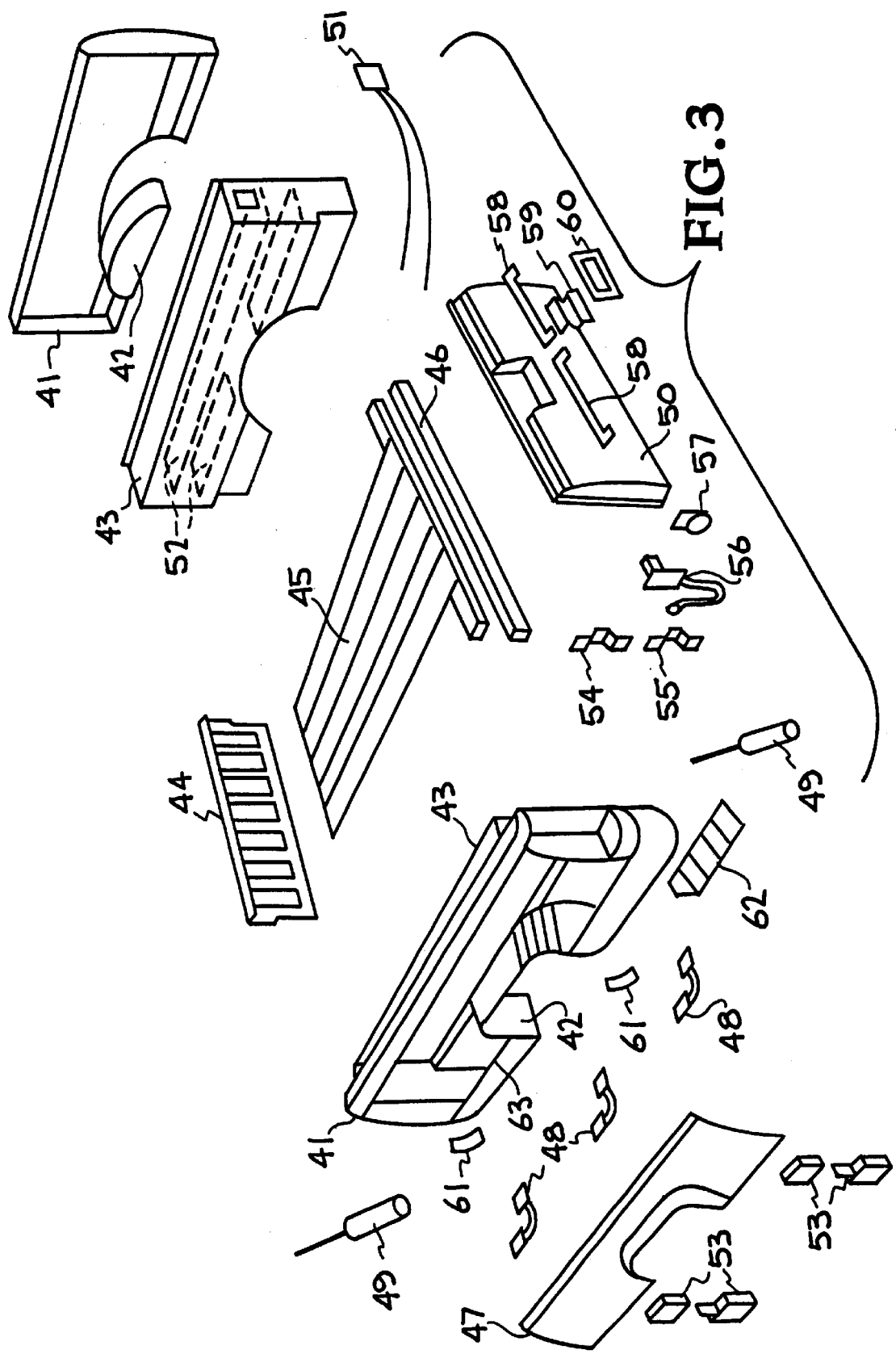
FIG. 3 is an exploded view of a fleetside or styleside light duty pickup bed incorporating the hidden storage system.

FIG. 3 illustrates in exploded view an embodiment of a fleetside or styleside version of a light duty pickup truck bed incorporating the hidden storage system, and which can be initially fabricated as a unit, or which can be formed by conversion of an existing bed. The initial fabrication process or method is described in detail hereinafter.

As shown in FIG. 3, the hidden storage system comprises side panel assemblies 41 for either a short or long bed, wheelhouse panels 42, storage housing assemblies 43 for either a short or long bed, a front panel 44, a floor panel 45 for either a short or long bed, a floor sill 46, a door panel assembly 47, door panel hinges 48, panel door gas charged shock absorbers 49, a tailgate assembly 50, a storage box handle, lock and latch assembly 51, storage shelving assemblies 52, door panel lock and latch assemblies 53, tailgate striker 54, tailgate outer hinge 55, tailgate latch and cable assembly 56, tailgate inner hinge 57, tailgate latch rods 58, tailgate handle 59, tailgate bezel handle 60, a wheel opening 61, a side panel shield 62, and a panel door gasket 63. While only one part or component is shown for simplicity in certain instances it has a corresponding component on an opposite side not shown. Different components may be fabricated from different materials, and can be manufactured using existing technology.

Figure 4:
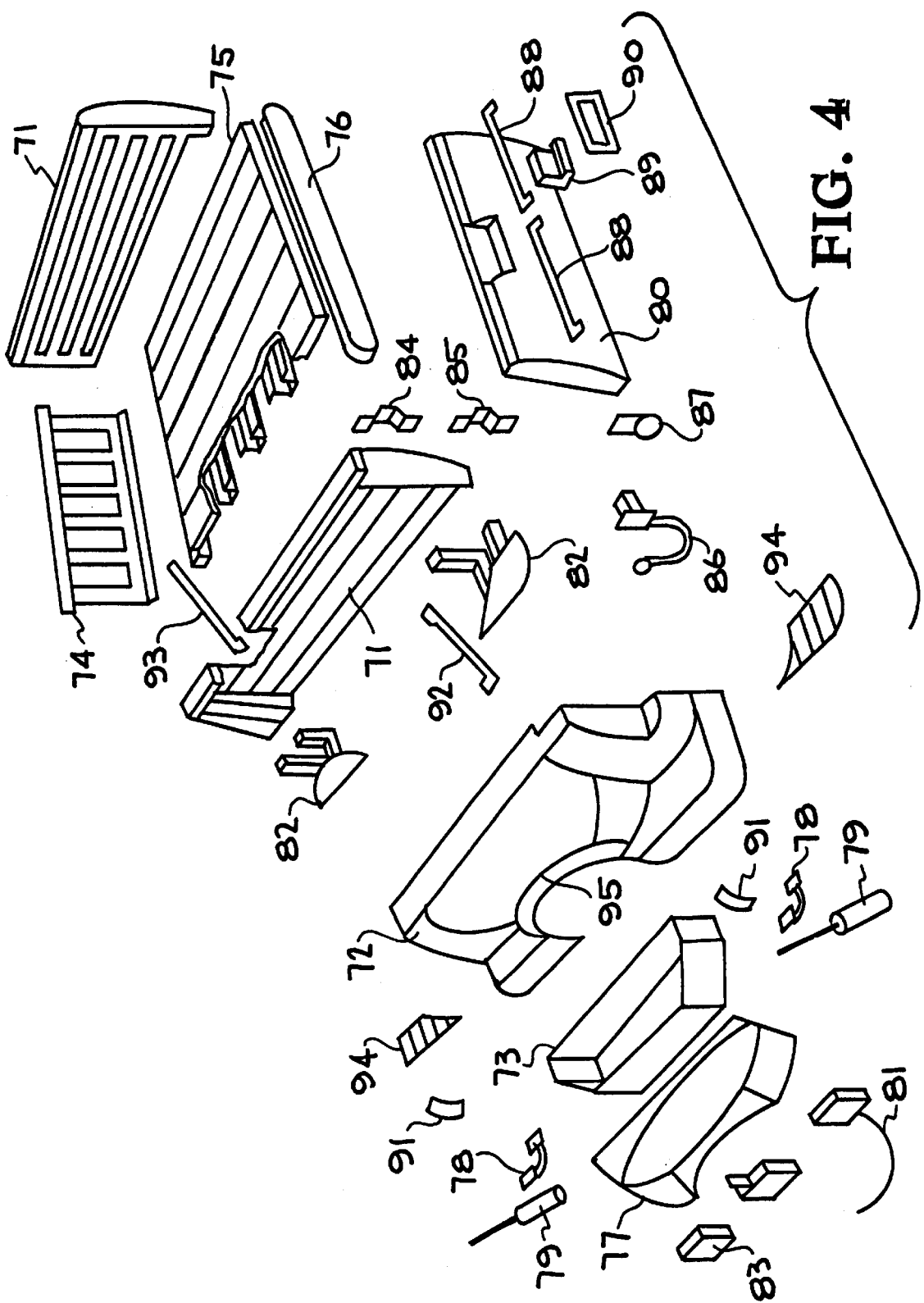
FIG. 4 is an exploded view of a stepside light duty pickup bed incorporating he hidden storage system.

As shown in FIG. 4, the hidden storage system can be incorporated into a stepside version of a light duty pickup truck bed, and comprises side panels 71 for long or short beds, fenders 72, only one shown, panel storage box assembly 73, front panel 74, floor panel 75 for long or short beds, a floor sill 76, door panel assembly 77, hidden door hinges 78, gas charged shock absorbers or lift struts 79, tailgate assembly 80, latch lock and cable assembly 81, fender brackets 82, door panel lock and latch assemblies 83, tailgate striker 84, tailgate outer hinge 85, tailgate latch and cable assembly 86, inner hinge 87, latch rods 88, tailgate handle 89, bezel handle 90, wheel openings 91, fender rear brace 92, fender front brace 93, front and rear step pads 94, and door panel assembly gasket 95. While certain parts are shown singly for simplicity, corresponding parts not shown are utilized on the opposite side of the bed.

FIG. 5 illustrates an embodiment of a pickup bed similar to FIGS. 1 and 2, with a hidden storage system mounted in the side panels thereof, but with three hinged side panel sections, and wherein the tail light assembly moves with the rearmost hinged side panel section. Similar components will be given corresponding reference numerals. The bed indicated generally at 10' is mounted on a frame, not shown, connected to a cab 11', and includes wheel wells, only one shown, at 18'. The storage system of FIG. 5 includes a storage box, not shown, as in FIGS. 1–2 and a lock/latch mechanism, as shown in FIGS. 8–9. The bed 10' includes side panels generally indicated at 15' on each side, only one shown, and each or either of which include three hinged sections 30, 31 and 32, with hinged section 30 extending from the front edge 22' of the side panel to an area above the wheel well 18' as indicated by vertical cut line 33, hinged section31 being located above wheel well 18' and defined by cut line 33 and another vertical cut line 34, with hinged section 32 extending from cut line 34 to the rear end of bed 10' and including tail light assembly 16'. Each of hinged sections 30 and 32 may be hinged horizontally or vertically so as to open upwardly, downwardly, or sideways, and may terminate along lines 35 and 36, or extend to the bottom of side panel sections 13'. Hinged section 31 is hinged horizontally and thus can be either raised or lowered. If section 31 is hinged at a lower end, it can be designed on the inner surface thereof to provide a work bench, and if hinged at the upper end, one or more slidable compartments or shelves, as described hereinafter with respect to FIGS. 16 and 22 may be mounted behind the hinged section 31 of the side panel, or if desired, can be hinged to open downwardly with slidable shelves or compartments located therebehind. While not shown, the storage box on each side of bed 10' may have a height equal to the height of the side panels 15', or may have a height less than the height of the side panels, as in the embodiment of FIGS. 1–2. Hinged sections 30, 31 and 32 may be optionally provided with a flush type handle latch on handle 37 and key lock 38, but unexposed latch and lock means as shown in FIGS. 8 and 9 are preferred.

Figure 6:
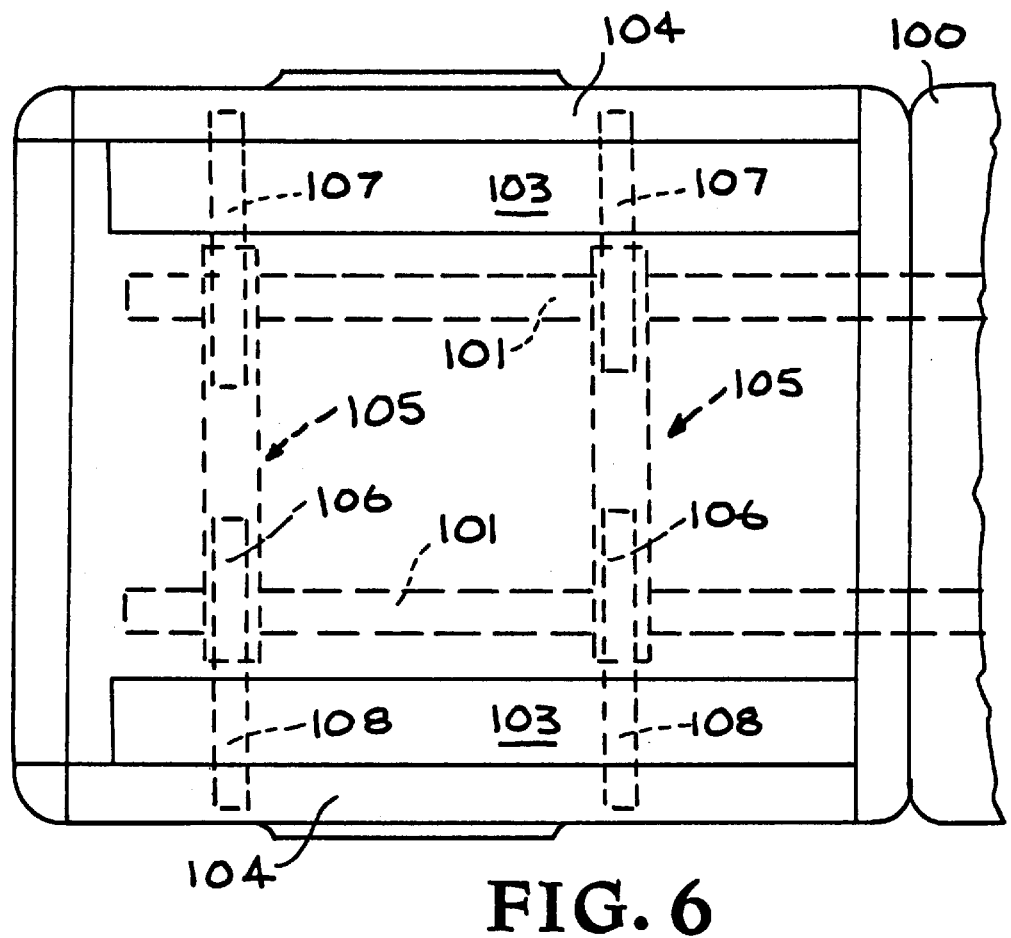
FIG. 6 schematically illustrates a collapsible support frame for the storage system which functions as a bed support and as a fuel tank protection system.
Figure 7:
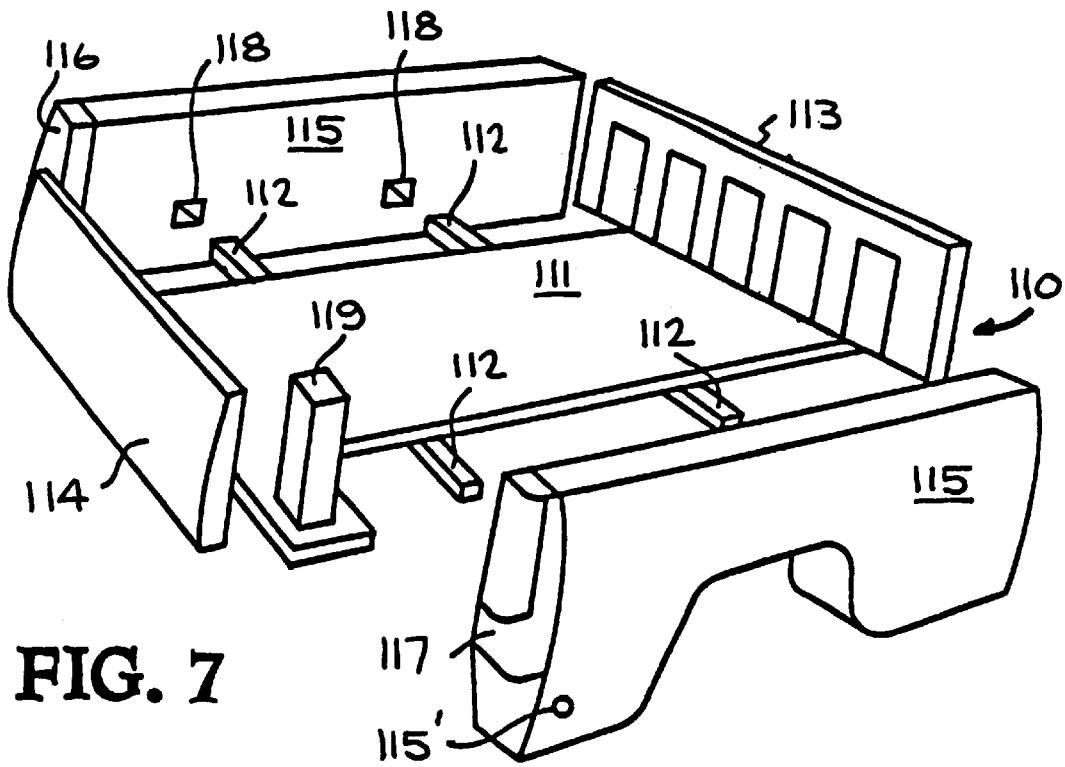
FIG. 7 illustrates a modular assembly method of the components of the hidden storage bed which are incorporated into the collapsible support frame of FIG. 6.

The hidden storage system, as illustrated in FIGS. 1–2 and 5, for example, may be provided with support/safety mechanisms, as illustrated in FIGS. 6 and 7, which comprise a pair of collapsible beams. Upon impact from a side of the storage system, the beams collapse rather than bending, thereby preventing rupture or puncture of a fuel tank, typically located beneath the bed of a pickup.

As seen in FIGS. 6 and 7, a vehicle 100, such as a pickup truck, having frame members 101 is provided with a hidden storage bed 103 having side panel/fenders 104, such as seen in FIGS. 1–2. A pair of collapsible support beams 105 are mounted across the frame members 101 and extend outwardly so as to terminate inside the side panel/fenders 104. As seen in FIG. 6, each of the collapsible support beams 105 is composed of a central section 106 and end sections 107 and 108 that are constructed to extend into central section 106. Beams 105 may be U-shaped, square, rectangular, circular, etc. in configuration. The length of the central section 106 and the length of end sections 107 and 108 is determined by the width of the bed 103. The end sections 107 and 108 may be spot welded or bonded, for example, at a desired point to central section 106, and upon impact the spot weld or bond is broken, and the impacted end section collapses into the central section 106 which prevents the bed 103 from bending downward toward the fuel tank located beneath the bed. The collapsible support frame of FIG. 6 is not needed in modular systems, such as FIGS. 12A–12B and 14–15, but is of special benefit for wide or extra width beds.

FIG. 7 illustrates a modular assembly approach for the hidden storage bed of FIG. 6 utilizing the collapsible support members or beams. As shown schematically in FIG. 7, the bed generally indicated at 110 is basically composed of five modules or assemblies comprising a floor assembly 111 to which collapsible support beams 112 are mounted or connected, a bulkhead assembly 113, a tailgate assembly 114, and a pair of side panel assemblies 115 having connected thereto tail light assemblies 116 and 117. Side panel assemblies 115 are provided with openings 118 into which collapsible support beams 112 extend. Floor assembly 111 includes a pair of support posts 119, only one shown, to which the rear of side panel assemblies 115 are secured. The side panel assemblies 115 may be constructed as illustrated in FIGS. 1–2, for example, or constructed to include a plurality of hinged side panel sections, as illustrated in FIG. 5, wherein the tail light assemblies are hinged to open with the side panel. If desired, an optional key entry or slot 115' may be incorporated into side panel assemblies 115 to release the side panel. Also, electrical—solenoid activated locks—can be utilized.

FIG. 8 and 9 schematically illustrate embodiments of a mechanical type and an electrical type of latch/lock mechanism for a hidden storage system of a pickup bed, such as shown in FIGS. 1–2 and 5, but the latch/lock mechanism can be utilized in the hidden storage system of any of the hidden storage systems of FIGS. 12–23, for example. Since the latch/lock mechanism is not visible from an external view of the vehicle, such is considered to be a hidden mechanism and is so defined herein. In the embodiment of FIG. 8, the latch mechanism is cable actuated. As shown, a vehicle indicated at 120 containing a hidden storage system generally indicated at 121 which includes a storage box as above described, and which includes at least one hinged side panel 122, and provided with an end gate or rear door 123, includes a lock release mechanism generally indicated at 124, having a keyed or keyless lock, not shown, and located at the rear of the storage system and spaced as indicated at 125 from the rear door 123. By this arrangement, the lock release mechanism 124 can be actuated from the inside of the vehicle without opening the end gate or door 123. The latch mechanism constructed of cooperating components are indicated at 126–126', 127–127', 128–128', and 129–129', with components 126, 127, 128 and 129 secured to the vehicle 120 or storage box within the enclosed area, while cooperating components 126', 127', 128' and 129' are secured to the inner and lower edge of the hinged side pane 122, such that when the side panel 122 is lowered, the components of the latch mechanism interconnect. The components 126–129 each include a movable release member 130, which is actuated by a cable 131 connecting the lock release mechanism 124 via a lever 132 of the lock mechanism 124. Thus, upon movement outwardly of lever 132 as indicated by arrow 134, the lock mechanism 124 is activated. Thus, upon movement outwardly of lever 13, as indicated by arrow 134, the cable 131 activates the movable release member 130, where latch components 126'–129' are released from components 126–129, and the hinged side panel 122 can be raised as illustrated. To re-secure the side panel 122 when lowered, the lever 132 of lock release mechanism 124 is moved inwardly, as indicated by arrow 134, whereby the activation cables 131 and release member 130 enable latch mechanism components 126–129 and 126'–129' to be reengaged for retaining the side panel 122 in a secured closed condition. Various types of mechanical lock/latch mechanisms are commercially available and thus a detailed description of a specific embodiment is deemed unnecessary. However, the lock/latch mechanism should be constructed to prevent the side panel 122 from being easily pried open. Some known lock/latch mechanisms require a 1500 pound pry to open same.

FIG. 9 illustrates an electrically activated lock/latch mechanism, and is constructed similar to that of FIG. 8 except that electric solenoids and electric leads replace the activation cables of FIG. 8 and the lock release mechanism requires only a push button or key to actuate the latch mechanism via the solenoids. Also, the lock mechanism may be remotely controlled, such as by well known vehicle security key/lock systems. As shown in FIG. 9, the lock release mechanism 124' is located at the rear of the storage box and spaced from the end gate or rear door 123 as indicated at 125. Cooperating latch mechanisms 126–126', 127–127', 128–128' and 129–129' are mounted on bed 121 and side panel 122 as described above in FIG. 8. Each of latch mechanism components 126, 127, 128 and 129 are provided with a solenoid 136, 137, 138 and 139 which are connected to lock release mechanism 124' via electrical leads 140, 141, 142, 143 and 144. To release the latch mechanism to enable opening of the side panel 122, the lock release mechanism 124' is activated, such as by a push button, key, or combination, as known in the art, which activates solenoids 136–139 thereby moving movable members 130 to allow latch components 126'–129' to be released from latch components 126–129, allowing side panel 122 to be opened. Since solenoid activated lock/latch mechanisms are well known in the automotive art, further description is deemed unnecessary.

While FIGS. 8 and 9 illustrate embodiments of the lock/latch mechanism with the lock release mechanism 124' located at the rear of the storage box, the lock release mechanism can be located at the front of the storage box, or if an electrical lock/release system is used, as in FIG. 9, the lock release mechanism 124' can be located in the glove box, behind the driver's seat, or elsewhere in the vehicle. If desired, a key actuated lock release mechanism can be installed in a hinged side panel section, but such would be visible from an external view of the vehicle and therefore would not be desirable in that the hidden aspect of the storage system would be reduced.

While the FIGS. 8–9 embodiments have illustrated the use of four (4) latch mechanisms, that number may be less for a single hinged side panel. Where the hinged side panel is composed of side panel sections, as in FIG. 5, each hinged section should include one or more latch mechanism, either mechanical or electrical. Also, where the side panel sections are hinged to open downwardly, the location of the cooperating latch mechanism components may be different and, for example, such may be secured to the sides of the hinged side panel sections and to a cooperating location on the storage box.

Figure 10:
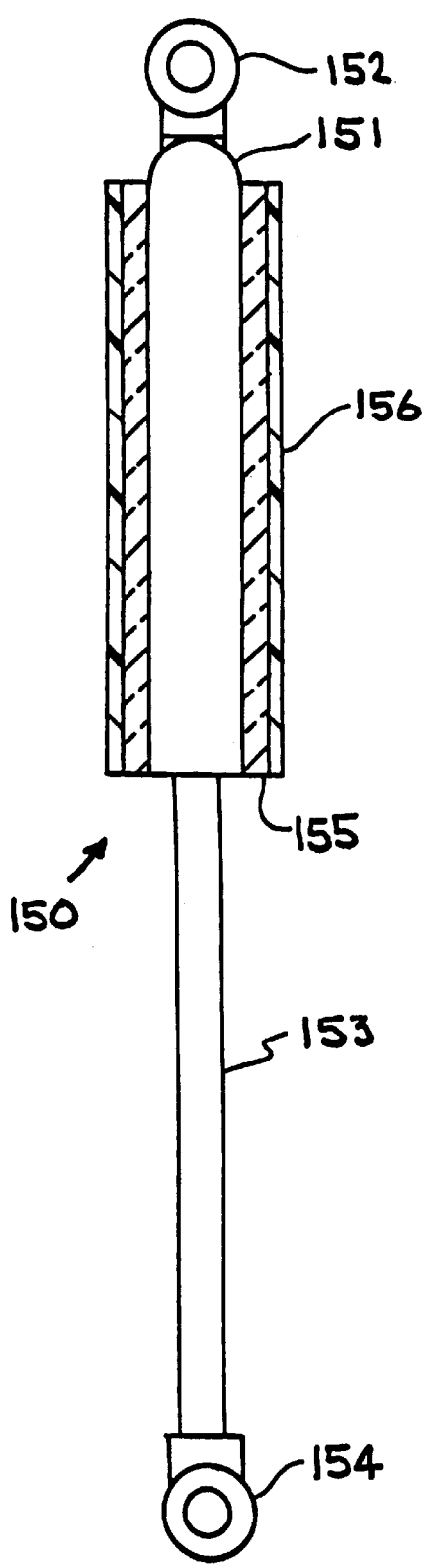
FIGS. 10 and 11 illustrate embodiments of strut assemblies for retaining a hinged side panel section in open condition, with FIG. 11 incorporating a thermostatically controlled heating arrangement for severe cold weather use.
Figure 11:
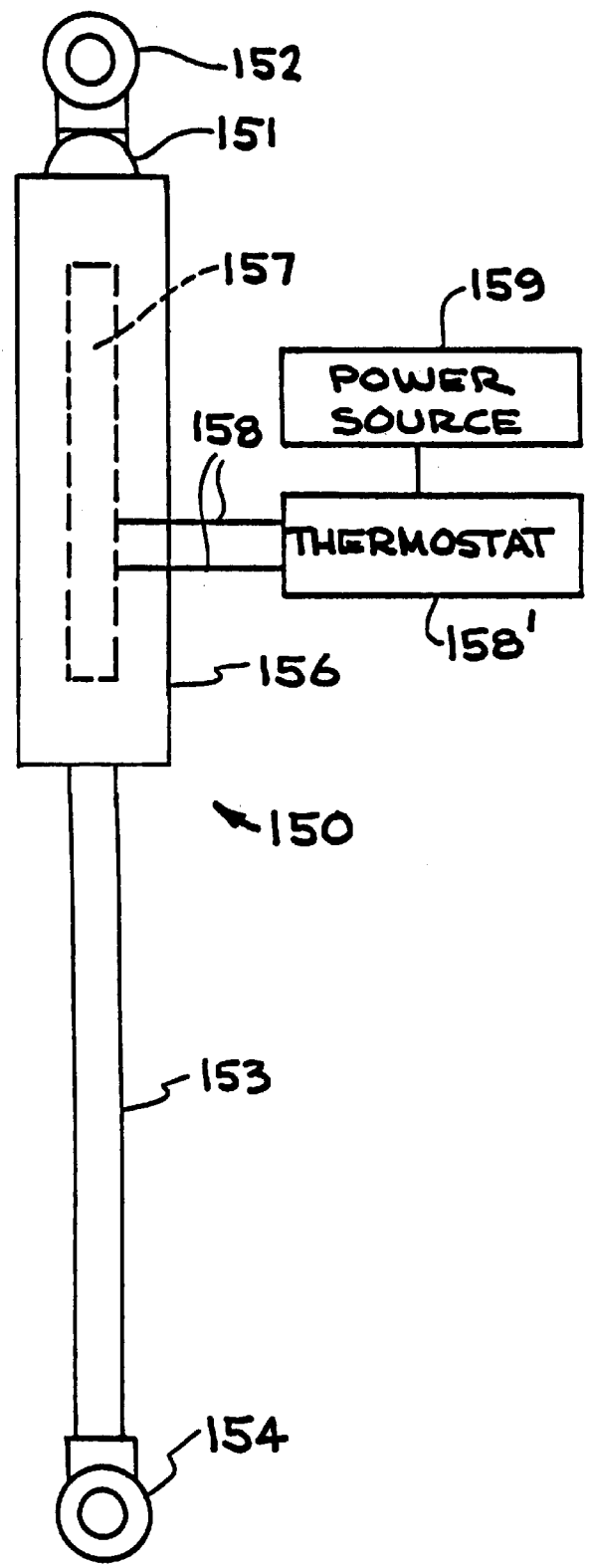

As pointed out above, the side panels are provided with means for retaining same in open position, such as by conventional torsion springs or strut assemblies, widely used in the automotive field for retaining open rear windows or doors. However, hinges also commercially available which are constructed to retain a door or window open, and thus could be utilized in the hinged side panels, particularly those that are hinged to open downward or sideways. The use of strut assemblies is generally preferred for upwardly opening side panels, but struts have disadvantages when operating in extreme temperature conditions, either hot or cold. This problem is resolved by the strut assemblies illustrated in FIGS. 10 and 11 wherein insulation and/or heating therefor is provided. FIG. 10 illustrates a conventional strut assembly with insulation about the body member, while FIG. 11 additionally illustrates an electrical heating strip for a conventional strut. However, the heating strip of FIG. 11 can be incorporated into the insulated strut assembly of FIG. 10. As shown in FIGS. 10 and 11, the strut indicated at 150 comprises a body member 151 having a connector member 152 at one end, ad a plunger member or rod 153 having a connector member reciprocally mounted in body member 151, ad which is sealed in member 151 as known in the art. The body member 151 rod/153 may be provided with a conventional fluid or air arrangement which allows the rod 153 to be moved in or retained in the body member 151. In FIG. 10, the body member 151 is provided with a layer 155 of insulation material and a protective layer or sleeve 156 about the insulation layer. However, depending on the composition of the insulation layer 155, the' protective sleeve or layer 156 may not be needed. In FIG. 11, which is constructed as in FIG. 10, the body member 151 is additionally provided with one or more electrical heating strips 157, only one shown, which would be electrically connected by electrical leads 158 via a thermostat 158' to the power supply 159 of the vehicle on which the strut is utilized. The electrical heating strip(s) 157 is positioned between the body member 151 and the insulation layer 155, whereby a heated/insulated strut is provided to withstand either extremely high or extremely low temperatures. However, the body member 151 may be provided with one or more heating strips, if desired. Instead of the strut assemblies, spring hinges or hydraulic hinge mechanisms can be used.

The invention involves a method for carrying out initial fabrication of a vehicle bed for pickup trucks, for example, which incorporates the hidden storage system. The method may be carried out via an assembly line operation as described with respect to FIGS. 3 and 4, or by a modular method as described with respect to FIGS. 7 and 12–23. In either case, the hidden storage system is incorporated into a vehicle bed with substantially no change in the appearance of the external side panel or fender/side panel of the bed. The side panels may be contoured according to any design or width desired, as well as to include fenders of any configuration, including expanded or bulged side panels and/or fenders.

In addition, a conversion method, such as described in above-referenced U.S. Pat. No. 5,784,769 can be utilized to enable damaged beds or existing undamaged beds to be modified to include the hidden storage system. In the case of damaged beds, new fender/side panels and hidden storage assembly components are prefabricated in a jig system platform assembly similar to the initial fabrication method described hereinafter, but without the bed panel, front panel and tailgate assemblies, as illustrated in either of FIGS. 3 or 4. These prefabricated hidden storage system components are available for four-five foot, six foot, seven foot, 8 foot and larger pickup truck bed lengths, as manufactured for any light duty truck, including the dual rear-wheel and king-cab trucks.

Original Equipment Manufacturing (OEM) Assembly Sequence

1. The manufacturing production and assembly of the hidden storage system begins in the forming and molding fabrication section. This is accomplished by means of stamp forming sheet metal into the pickup truck bed components in hydraulic presses with accompanying dies, breaks and shears.

2. Manufacture of the hidden storage system components may also be accomplished by means utilizing SMC (Sheet Molded Compounds) composite materials in molded or sheet goods, fiberglass reinforced resins, or other molding compounds.

3. Roll or flat stock forming sheet metal (with a thin coat of forming oil) is fed into a sizing shear die or forming die, if the material is pre-cut The process continues through subsequent sizing and forming die which progressively shape the bed panels for the front end, floor, wheelhouse, exterior and interior door and tailgate. Reinforcement, bulkhead, clips and shelving components are fabricated similarly by standard of the industry techniques. Metal structural components in the bed are not substituted with SMC material, but may be integrated for attachments and reinforcements.

4. All metal components, or SMC or composite fabricated components, are placed into an inventory system for final assembly. This manufacturing assembly procedure utilizes a JIT (just-in-time) parts system.

5. The final assembly of the fabricated and vendor outsourced components begin with feeding parts into a manual or a computer automated main assembly line conveyor or platform skid system by means of a married computer automated spur conveyor system. Parts are fed upon demand controlled by a computer sequencer operation.

6. The basic bed structural components are conveyed to the automatic pin-fit jib robotic welding platform system, or manual fixture system, which positions and locks the bed components of floor panel, front end panel, inside storage box panels, wheelhouse and tailgate bulkhead panel into a precise tolerance weld-up or bonding by means of utilizing state of the art robotic welding machines or bonding adhesives and associated platform positioning equipment.

7. The robotic welding machines retract and the jig system reverses lockup closure of the welded bed components allowing the chain conveyor or platform to lift the bed into the next assembly sequence of bolting the pre-assembled tailgate door and hidden storage exterior door panel into the assembly held in position by means of special wire restraints to prop open the doors and tailgate for priming and final painting systems application.

8. The assembled bed proceeds into a highly illuminated booth to allow visual Q&A (quality and assurance) inspection for dolly patching, grinding and sandout correction of any minor surface imperfections prior to primer application. Special brazing or bonding is also accomplished at this stage in stress areas at the upper portion of the inside corners of the tailgate bulkhead.

9. After exiting the inspection and surface correction station, the bed progresses through a deionized water spray bed paint surface conditioning booth and then continues to be conveyed into the immersion primer bath. The welded bed is primed by means of an immersion bath system. The bed enters and leaves the primer bath at inclined positions to allow entrapped primer material to quickly drain from the bed and storage compartment areas. Strategic drain holes are provided to allow excess primer material to drain from entrapped areas.

10. Primer curing is accomplished by means of conveying the bed through a heated tunnel drying booth until the temperature reaches approximately 345–350 degrees Fahrenheit (250 degrees for composite fiberglass material) for the recommended time specified by the paint manufacturer as sufficient to cure the metal protection primer coat. The bed then progresses along the conveyor allowing cooling of the bed. The bed continues to progress into a second inspection station whereby the bed is highly illuminated by means of a lighting system along the walls and ceiling soffit areas allowing visual inspection for primer coat imperfections.

11. The next station is used to accomplish manual surface sanding of any surface defect, and hand spray touch up of the areas requiring correction of any minor aberrations found in the paint film surface. Rapid paint curing of touch up areas is accelerated by utilizing an ultraviolet lamp or heat which travels with the conveyed bed for approximately 8 minutes.

12. Caulking is then strategically applied over bed fabrication seams by means of a hand held caulking gun with controlled pressure fed in a precisely controlled manner, forming a smooth caulk bead for aesthetic reasons and preventing moisture from entering the bed joints to inhibit hidden rust formation, and collection of unsightly dirt or debris.

13. After the drying booth and visual inspection sequence, the bed continues into the final color paint booth. Paint color is re-selected and is automatically applied by means of a robotic turbo head paint applicator onto the bed. The bed is negatively charged and the paint is positively charged. The paint precipitates onto the bed components electrostatically. Since some composite parts use resin color fillers, precluding the need for paint, special fillers are placed in the composite parts to facilitate conduction of paint when used.

14. Paint mil thickness application, if obtained by means of controlling the application term, fluid flow and speed of the robot. Inside of corners will require hand gun touch up paint application to obtain the specified mil thickness where discreet electrostatic precipitation deficiencies occur due to the physics inherent to automatic electrostatic paint application.

15. The bed paint drying and cure will then be processed by means of a tunnel oven which will allow temperature and time cure of the final paint coating. Heat is increased to a maximum of 345 degrees F. and slowly cooled as it progresses to the final visual inspection station.

16. The final visual quality assurance inspection is undertaken by the means of a high illumination booth. Units with surfacial imperfections in the paint are removed from the line and individually repaired manually with standard paint rub out techniques with re-coat as required. Re-coat paint cure is accelerated with an ultraviolet paint lamp or heat lamp applied to the re-coat surface for approximately 8–10 minutes.

17. The bed continues along the assembly line conveyor through final assembly component stages whereby the tailgate and hidden storage door hardware, including strikers, latches, locks, handles, cables, solenoids, alarms, hidden latch assemblies, perimeter and specialty door gaskets, storage compartment drain check valving, wiring harnesses, tail light assemblies, shelving, shelving clips, shelving liners and manufacturing decals are manually installed or applied.

18. Final quality assurance inspection for form, fit and function is performed as the bed exits the assembly line. Special PVC plastic film is placed over bed areas subject to transport damage, and gas hatch covers to prevent opening by wind pressure.

19. The finished bed or modular components are lifted by means of a forklift and placed into a special rack designed for truck inter-model and low boy trailer shipment to stocking distributors. Bulk shipment of modular components may also be used.

FIG. 7 illustrates an exploded view of a modular approach to the fabrication and/or assembly of a hidden storage bed utilizing the collapsible support members or beams, as described above with respect to FIG. 6. As shown schematically in FIG. 7, the bed 110 is basically composed of five modules or assemblies comprising a floor assembly 111, a bulkhead assembly 113, a tailgate assembly 114, and a pair of side panel assemblies 115, having connected thereto tail light assemblies 116 and 117.

Modular Manufacturing And Assembly Sequence

Utilizing conventional molding and manufacturing techniques involving various materials including metals, fiberglass and composite plastics of different types, various components can be manufactured and/or assembled in modules, whereafter the various modules are assembled to produce the hidden storage bed. One such modular assembly approach is illustrated in FIGS. 7 and 16–22.

Figure 16:
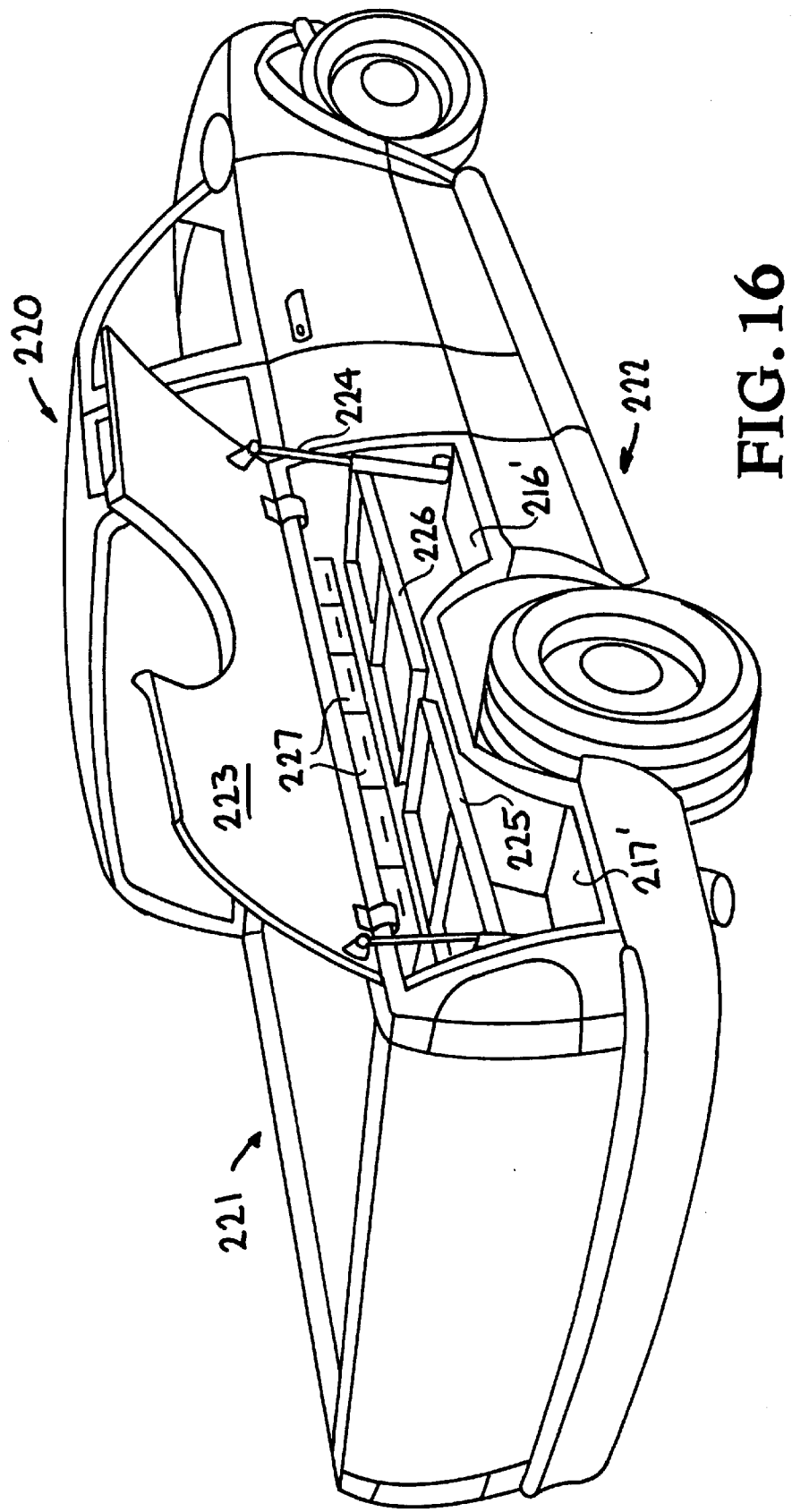

The broad concept of modular fabrication and assembly is illustrated in FIG. 7 wherein modular assemblies 111, 113, 114 and 115 are manufactured and/or assembled prior to these modular assemblies being secured together. Thus, the various modular assemblies 111, 113, 114 and 115 can be produced at different or at the same facility in which they are finally assembled. For example, the collapsible support beams 112 (see FIG. 6) can be manufactured in one facility and forwarded to a facility where the floor assembly is manufactured and/or assembled. The bulkhead assembly 113 and tail gate assembly 114, which are conventional components, can be manufactured/assembled and shipped to the location of final assembly. The side panel assemblies 115 can be manufactured/assembled at the final assembly facility or elsewhere, and are constructed in accordance with a user's need. For example, the storage box and the hinged side panel, as shown in FIGS. 1–2 and 16, may extend the entire length of floor assembly 111, or the side panel and storage box may be manufactured to be located in front of or behind the wheel well. Also, the side panel can be hinged along a lower end thereof, or be split either horizontally or vertically into sections (see FIG. 5) which may be hinged to open either upwardly, downwardly or sideways, depending on the need of the user.

The side panel assemblies of FIG. 7 may also be manufactured/assembled to provide a desired shelf/compartment arrangement within the storage box. While FIG. 16, described hereinafter, illustrates slidable, rotating or swingout, and adjustable shelf arrangements, the shelves may extend to full length of the storage box to accommodate storage of items such as skis and ski equipment, golf bags, etc., or the storage box may be assembled to include a plurality of compartments or shelves for the storage of small parts, such as illustrated in FIGS. 17–22, described hereinafter. Thus, a potential user can order a desired shelving/compartment arrangement and such can be initially manufactured/assembled into the side panel assemblies of FIG. 7.

While not shown, the tail gate assembly and floor assembly, for example, would be manufactured/assembled to include the necessary hinges, locks and retaining mechanisms normally utilized for a conventional tail gate assembly, such as shown in FIGS. 3 and 4. Also, not shown in FIG. 7 is the lock/latch mechanism for the side panels. The side panel assemblies can be secured to the floor assembly either after or prior to the attachment of the bulkhead assembly to the floor assembly. The assemblies 111, 113 and 115 can be interconnected by conventional techniques, such as welding, spot-welding, etc., whereafter the assembled bed may be painted and readied for installation on a vehicle.

Figure 12A:
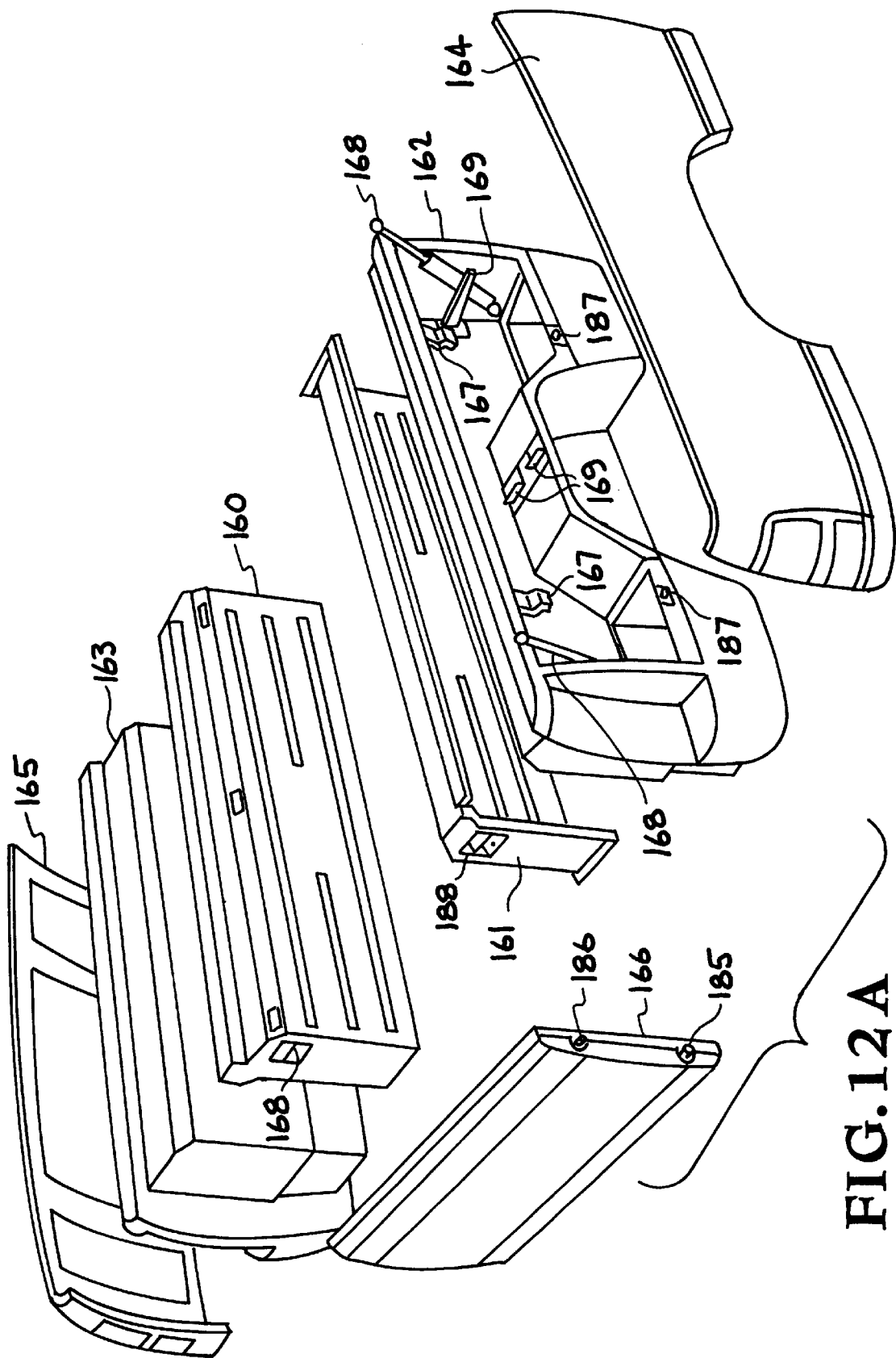
FIGS. 12A and 12B are exploded views of a modular fabricated hidden storage pickup bed made in accordance with the present invention, with FIG. 12B utilizing a plurality of hinged side panel sections.
Figure 13:
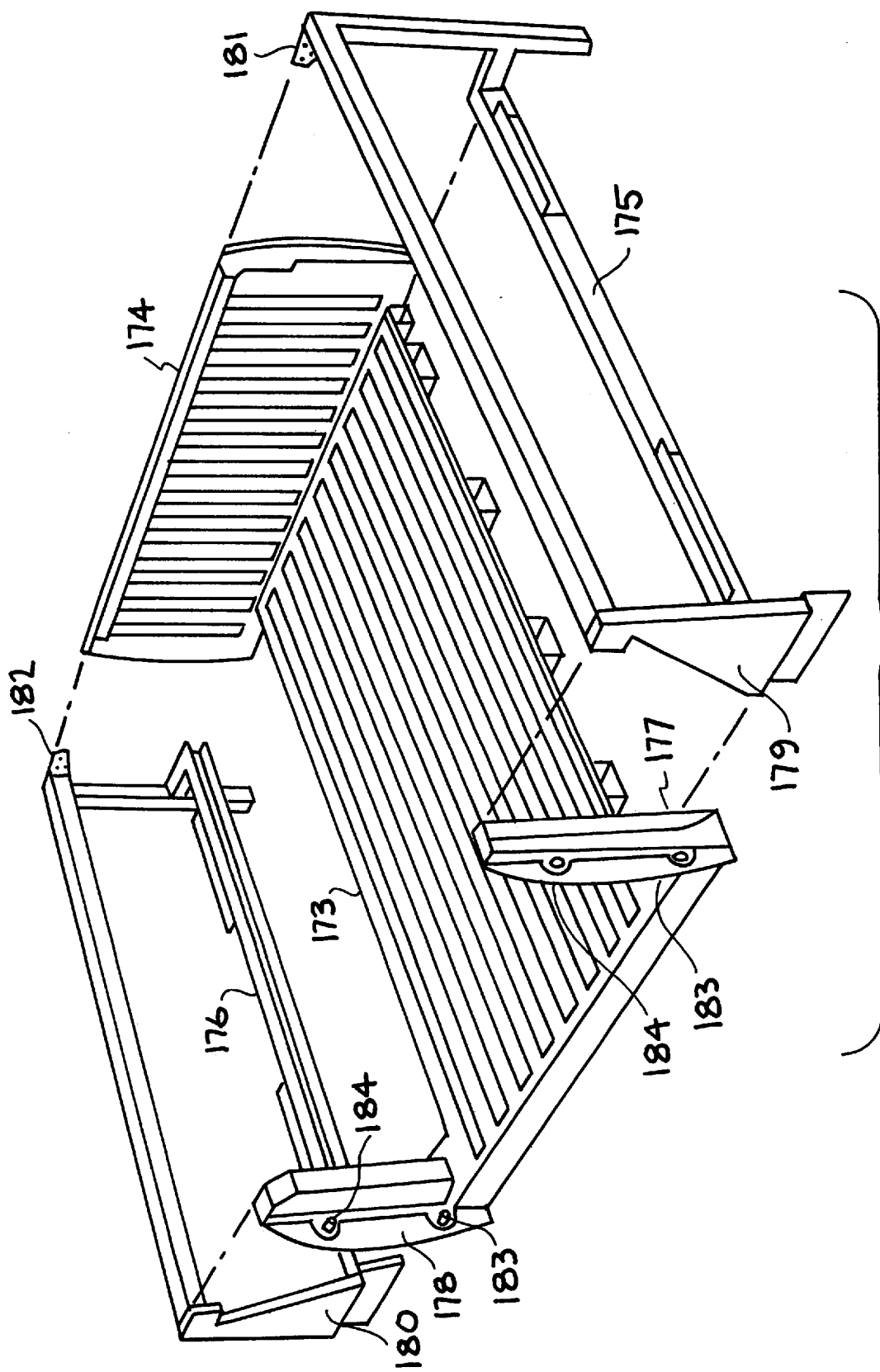
FIG. 13 illustrates an exploded view of the basic structural components of modular fabricated hidden storage bed showing only the floor bulkhead and side panel support structures.

FIG. 12A illustrates another modular approach for fabrication and assembly of a conventional pickup bed with a hidden storage system incorporated therein, and is constructed to be assembled on the structural framework illustrated in FIG. 13. As shown in FIG. 12A, the components comprise interior side wall modules 160 and 161, storage box modules 162 and 163, side panel modules 164 and 165, which include the tail light assemblies, and a tail gate module 166. The storage box modules 162 and 163 include hinges 167 and struts 168 for attachment of the side panel modules 164 and 165, as well as supports indicated at 169 for shelving. The supports can include a bracket with Velcro strips, or the shelves can be held in by Velcro brackets.

Figure 12B:
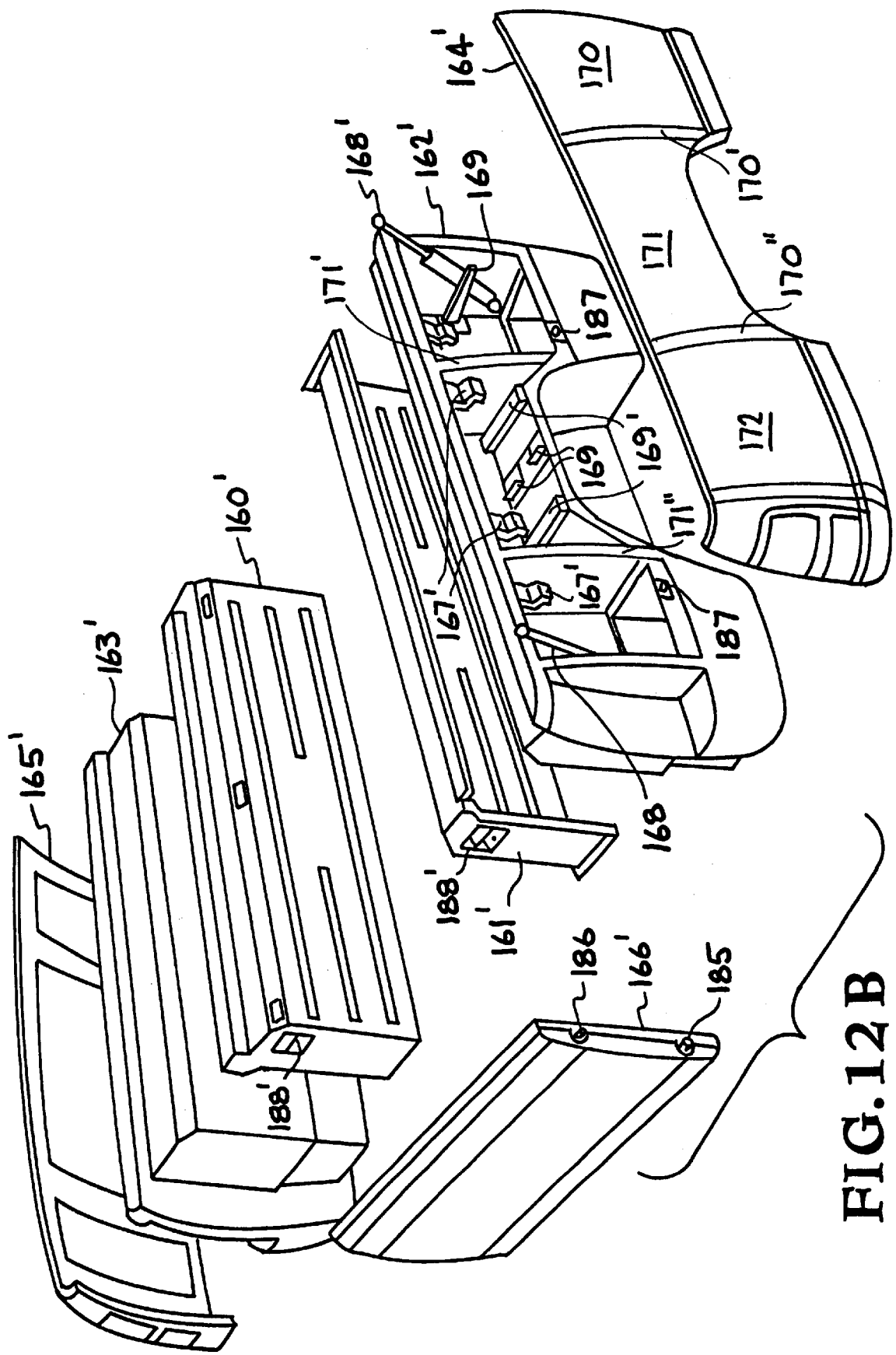

FIG. 12B illustrates a modular assembly like FIG. 12A with the exception that the side panels include three hinged sections, and corresponding components are given similar reference numerals. As shown in FIG. 12B, the side panel modules 164' and 165' are provided with sections 170, 171 and 172, separated by side panel segments 170' and 170" which align with compartment separators 171' and 171" on the storage box modules 162' and 163', and the storage box modules 162' and 163' include hinges 167' for each of sections 170, 171 and 172. While sections 170 and 172 have been shown to be hinged at the upper end thereof, the hinges can be mounted at the lower openings in the storage box modules or they can be mounted on the sides of the storage box modules 162' and 163' to provide a vertical hinge arrangement whereby the sections 170 and 172 open downward or sideways, as indicated by arrows, to expose the interior of the storage box modules. Note the shelf slide arrangement 169' for a slidable shelf under panel section 171, as indicated by arrows and legends, which may slide out/hinge up or down.

FIG. 13 illustrates a floor module 173, a bulkhead module 174, and storage box structural support modules 175 and 176 which may be fabricated of a composite material or metal. Floor module 173 includes a pair of upright posts 177 and 178 to which ends 179 and 180 of structural support modules 175 and 176 are secured, as indicated by dash lines, with support modules 175 and 176, including flanges 181 and 182, to be secured, as by bolts, to bulkhead module 174, as indicated by dash lines. The support modules 175 and 176 may also be spot welded along the length of floor module 173. The storage box modules 162 and 163 of FIG. 12A or modules 162' and 163' of FIG. 12B are attached in structural support modules 175 and 176, as by bolting, spot welding, bonding, or combination thereof, etc. The interior side wall modules 160 and 161 are then attached to the storage box modules and to the floor module 173 and bulkhead module 174, as by spot welding, where the tail gate module 166 is attached to members 183 and 184 on posts 177 and 178 by members 185 and 186 on tail gate module 166, and the side panel modules 164 and 165 or 164' and 165', or combinations of 164 and 164', for example, are secured by hinges 167 or 167' and struts 168 or 168' to the storage box modules 162 and 163. Latch mechanisms for the side panel modules are shown at 187 on the storage box modules in FIGS. 12A and 12B, with the release or handle mechanism shown at 188, mounted on inner wall modules 160 and 161. The side panel modules 164–165 or 164'–165' may be contoured according to any design or width desired, as well as to include fenders of any configuration. Thus, by mere change of the side panel modules, the same hidden storage system can be incorporated into beds for any pickup truck manufactured, such as General Motors, Ford, Dodge, etc., wherein the side panel modules are contoured to the desired style of the manufacturer.

Figure 14:
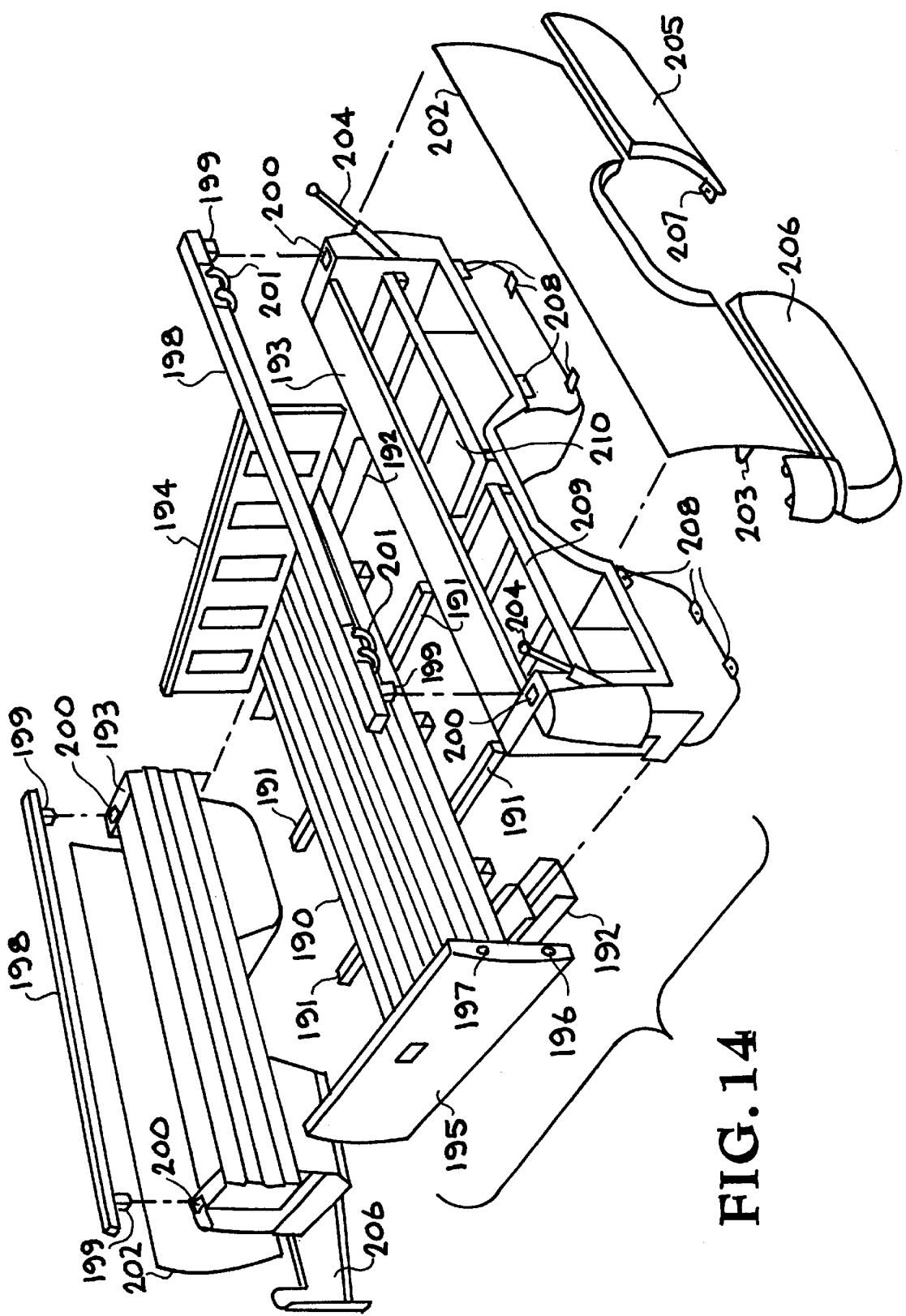
FIG. 14 is an exploded view of another hidden storage modular bed assembly which utilizes common designed for manufacturing (DFM) structural components for various side panel contours, such as the contours of pickup beds produced by General Motors, Ford, Dodge, or customized beds, etc., wherein specific exterior components (side panels) for the individual manufacturers can be readily attached.
Figure 15:
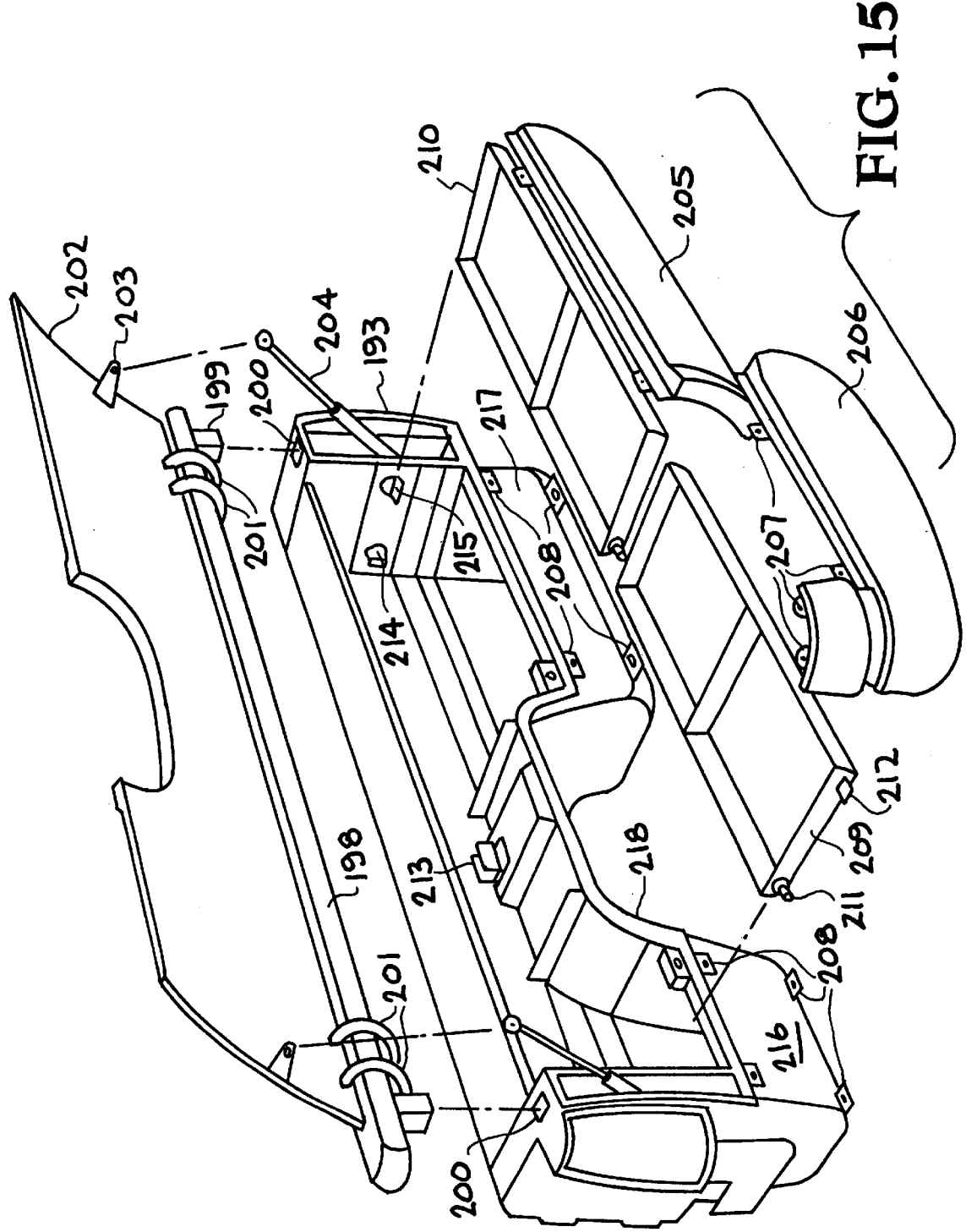
FIG. 15 is an enlarged showing of a section of the FIG. 14 hidden storage modular bed assembly with the hinged side panel section mounted on a support structure via a spaced hinge arrangement.

FIGS. 14 and 15 illustrate another modular fabrication and assembly approach wherein the floor module includes a collapsible support arrangement, as described above with respect to FIGS. 6 and 7, and wherein structural support modules of FIG. 13 are replaced by support beams under the floor module, and the side panel modules are hinged on an upper bar assembly. With the exception of the exterior components (side panel modules, the upper bar assembly, and the lower skirt assemblies), all components are common DFM components, thereby reducing tooling requirements, and can be utilized by any bed manufacturer with only the exterior components being fabricated to a manufacturer's specific contours or designs.

As shown in FIG. 14, the bed assembly comprises a floor module 190 with collapsible support beams 191, only as required for beam support strength, and support beams 192 for storage box modules 193, as indicated by a dash-dot line. A bulkhead module 194 is mounted to the floor module 190, and the storage box modules are constructed to support and latch a tail gate module 195 via members 196 and 197 which cooperate with members, not shown, mounted on the storage box modules 193. An upper support bar assembly 198, having protruding members 199, is adapted to extend into and be secured into openings 200 in storage box modules 193, as indicated by a dash-dot line. Support bar assembly 198 is provided with the hinge assemblies 201 adapted to be connected to side panel modules 202, while side panel modules 202 are connected by members 203 (only one shown) to strut assemblies 204 on storage box modules 193. Lower skirt assemblies 205 and 206 are secured by members 207 (only one shown) to members 208 on the storage box modules 193.

FIG. 15 is an enlarged view of components 193, 198, 202, 205 and 206 of FIG. 14, and in addition illustrates sliding trays or shelves 209 and 210, having supports 211 and 212 in an exploded view, showing storage box supports 213, 214 and 215 for the trays. As seen more clearly in FIG. 15, the storage box modules 193 include storage pockets 216 and 21 in front of and behind the wheel well section 218 of the storage box modules.

The storage bed system components of the embodiment of FIGS. 12A, 12B and 13, and the embodiment of FIGS. 14 and 15 may be constructed from ether composite (e.g., SMC, LPMC, fiberglass, ABS, polyesters, urethanes) or metal. The exceptions, of course, are those components that need steel bolts, latches, hinges, etc. Assembly can be accomplished with mechanical bolting, screwing, etc.; welding, brazing, etc.; by structural adhesive bonding; or by a combination thereof.

Figure 19:
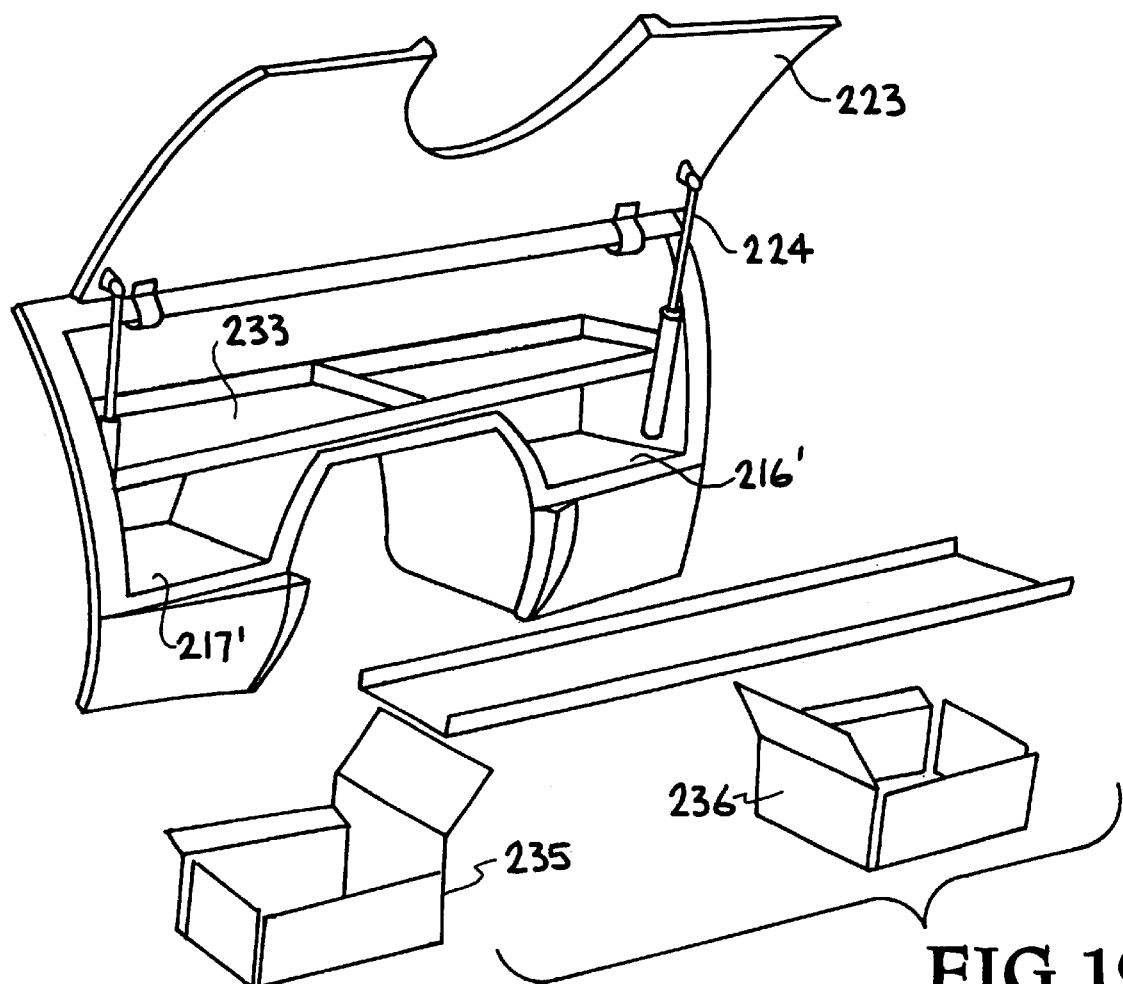
Figure 20:
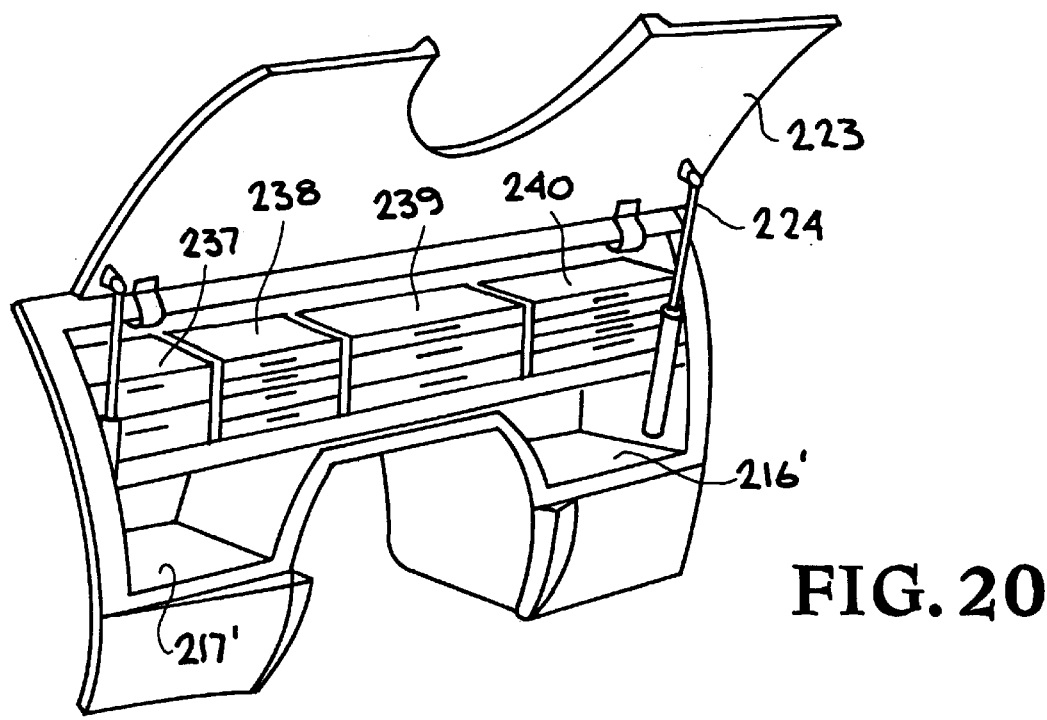
Figure 21:
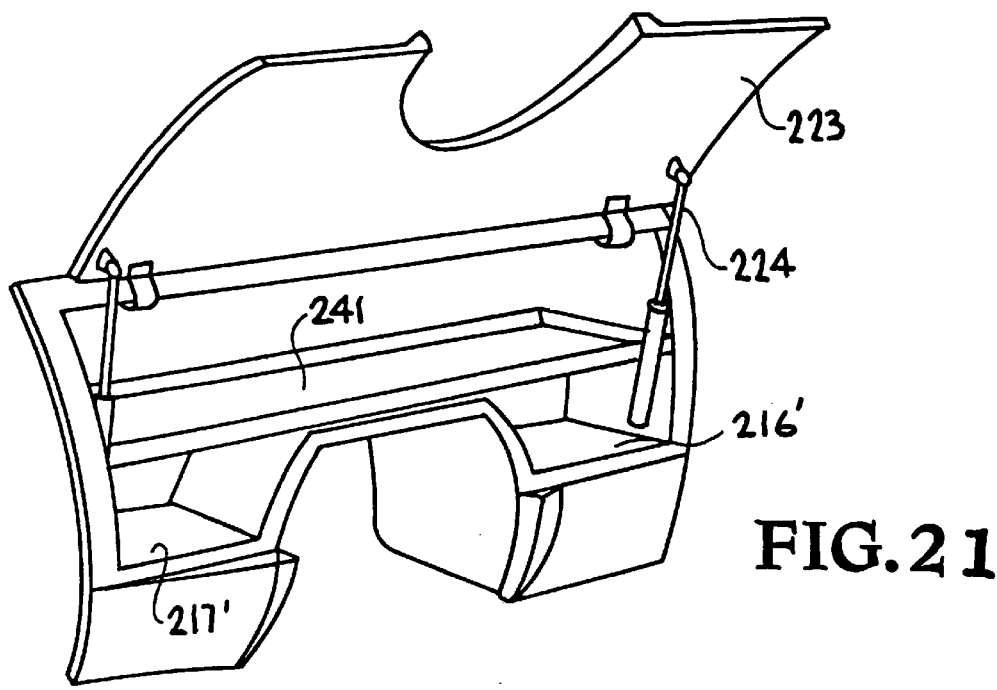
Figure 22:
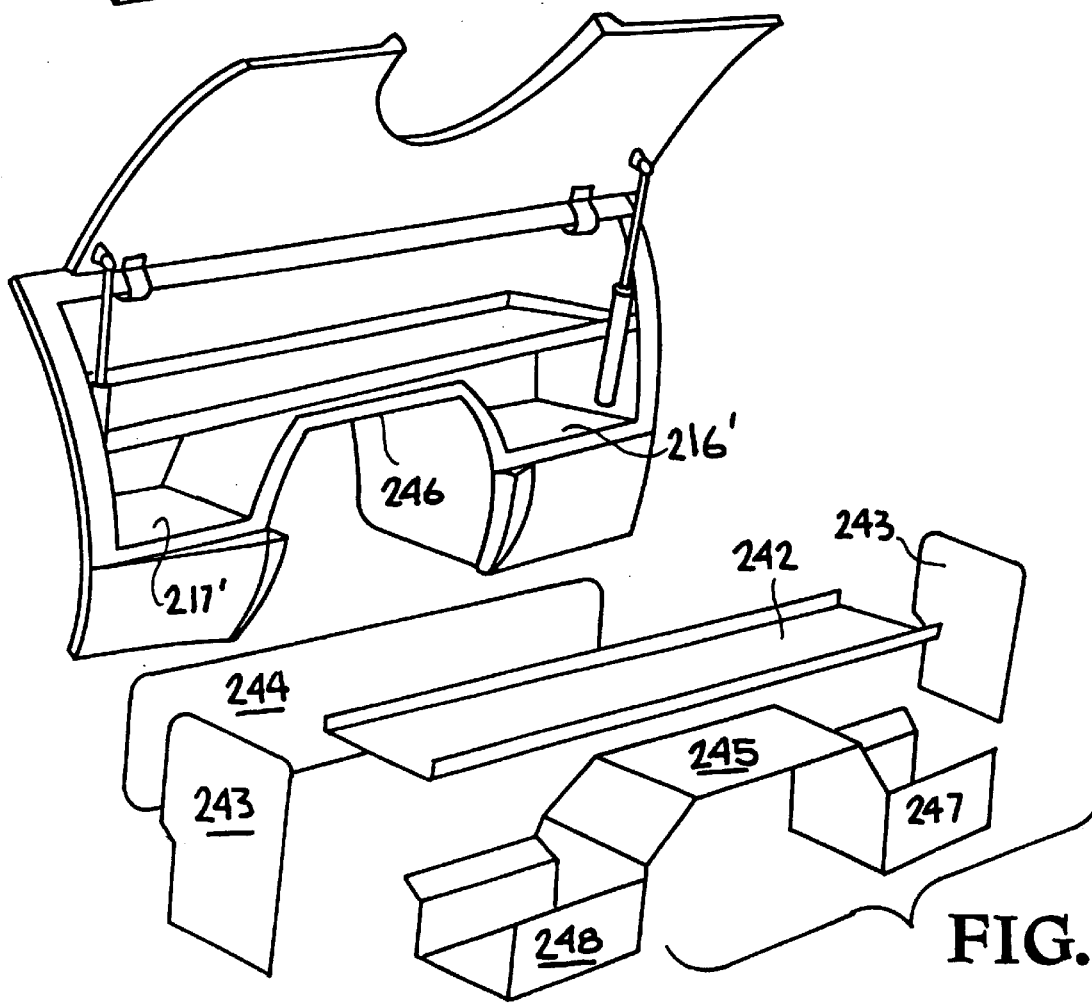

FIGS. 16–22 illustrate a conventional pickup truck bed with different hidden storage systems constructed as modular assemblies for assembly into the bed. As shown in FIG. 16, the pickup truck, generally indicated at 220, is an extended cab version with the bed, generally indicated at 221, incorporating a hidden storage system, generally indicated at 222, located behind a hinged side panel section 223 of the bed, the hinged side panel section being retained in open position by strut assemblies 224. The storage system, as shown in FIG. 16, includes storage pockets 216' and 217', sliding trays 225 and 226, and a series of slidable boxes 227. The storage system of FIG. 17A is generally similar to FIG. 16 except for the configuration of the sliding trays 225' and 226' and the number and sizes of the slidable or non-slidable boxes 227'. As seen in FIG. 17B, the hinged side panel may include one or more storage pockets 223'. FIG. 18 differs by the use of two layers of shelves or trays, with the lower layer composed of two sliding trays 230 and 231 with compartments therein, and a full length shelf 232 with compartments of various sizes therein. FIG. 19 illustrates a storage arrangement, in addition to the storage pockets 216' and 217', which utilizes removable components, including a full length shelf 233 or a similar shelf 234 with two compartments, and removable boxes 235 and 236 adapted to be located in pockets 216' and 217'. FIG. 20 illustrates a system that, in addition to the storage pockets 216' and 217', uses a series of slidable boxes or trays of different sizes indicated at 237, 238, 239 and 240. The trays, compartment liners, etc. of FIGS. 18–22 may be composed of plastic, rubber compounds, etc. FIG. 21 illustrates a single shelf or open tray 241 that extends the full length of the storage box. FIG. 22 illustrates a full length shelf 242 with side members or compartment liners 243 and a back member or liner 244, and a single unit 245 which extends over the wheel well 246 and includes pocket sections 247 and 248 that extend into pockets 216' and 217'. The storage pockets of FIG. 17B may be incorporated into FIGS. 18–22. It is recognized that various other shelving, tray and box arrangements can be formed into the storage box modules, such as shown in FIGS. 12A, 12B and FIGS. 14–15, and that the arrangement of storage box modules on one side may differ from that of the other side of the bed, whereby a user may design the two storage box modules to meet the specific need of that user.

Figure 23:
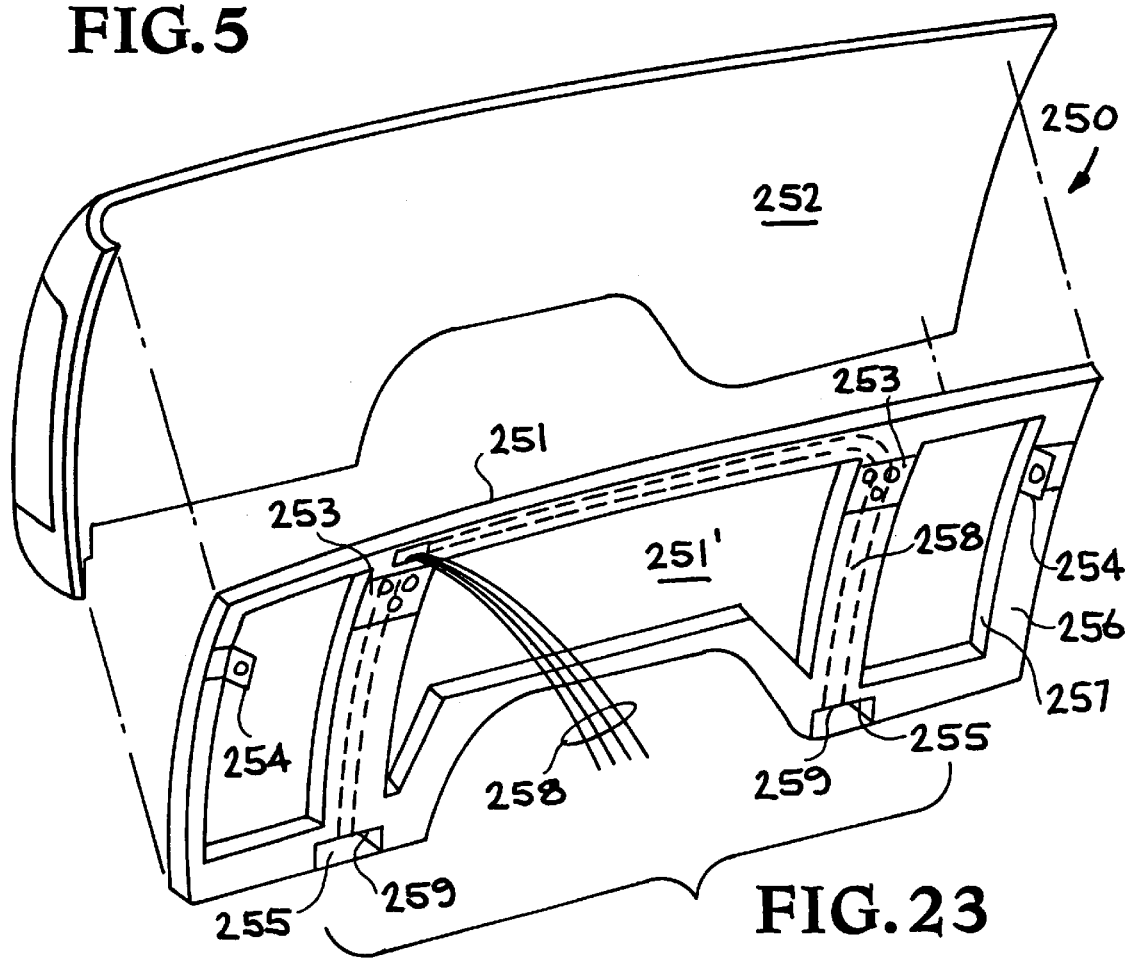
FIG. 23 illustrates a view of a hinged side panel assembly of a hidden storage system, such as illustrated in FIG. 12, but showing electrical cable seals, hinge attachments, and rotatory latches therefor.

FIG. 23 illustrates an embodiment of a hinged side panel module for a hidden storage bed, such as illustrated in FIGS. 1, 7, 12A, 14 and 16. The hinged side panel module, generally indicated at 250, is composed of an inner panel 251 and an outer panel 252 secured to the inner panel 251, as indicated by dashed lines. Inner panel 251 may include a door storage pocket area 251'. The panels 251 and 252 may be formed as a single unit in a single operation or as two units, as shown, combined by assembly after fabrication, and may be formed of a composite material or a metal. The inner panel 251 is provided with hinge attachments 253, strut assembly attachments 254, latch recesses 255, reinforcement 251 which may be structural foam, ad seal assemblies 257. Also, latch cables 258 are secured to the inner surface of panel 251 and to latch members 252 located in latch recesses 255. Where the outer panel 252 is utilized by itself, it will be provided with needed reinforcement.

Figure 24:
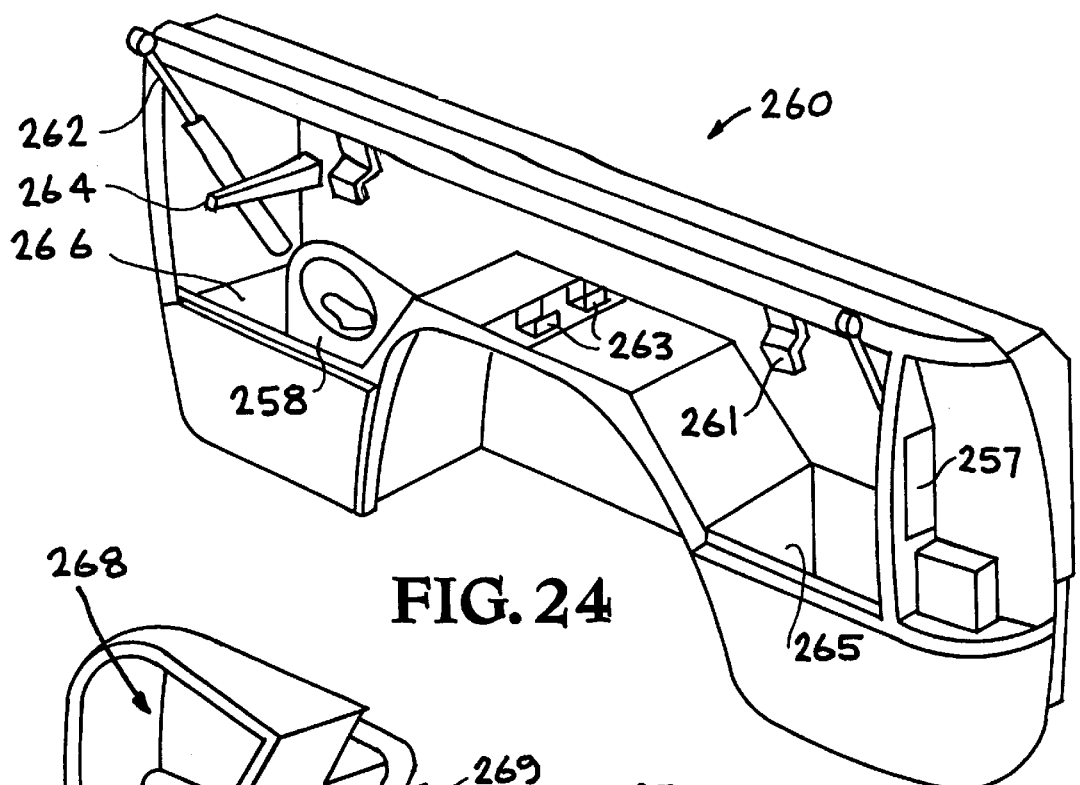
FIGS. 24–26 illustrate a fuel filler housing assembly for the hidden storage system.
Figure 25:
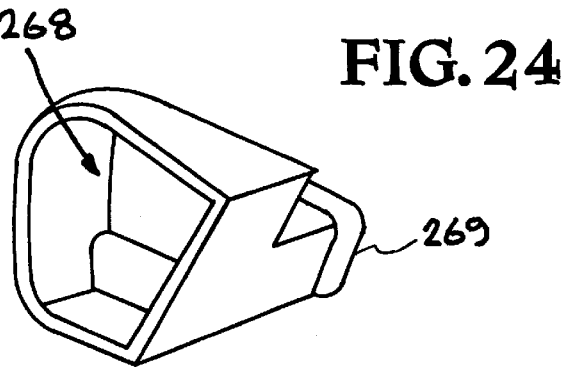
Figure 26:
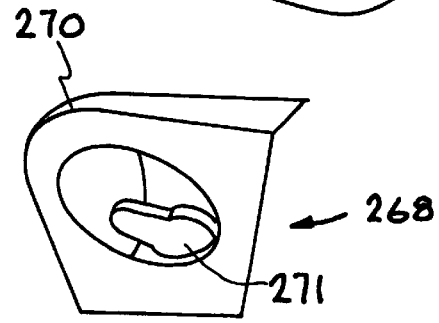
Figure 27:
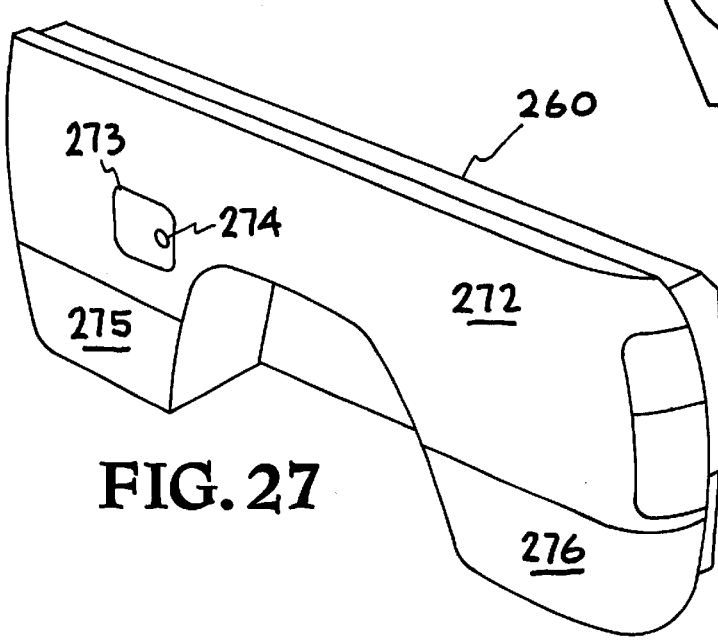
FIG. 27 illustrates a side panel having a fuel access flap for use with the storage system of FIGS. 24–26.

FIGS. 24–27 illustrate a storage box module and an associated hinged side panel module, the storage box module incorporating a fuel filler assembly. The storage box module, indicated generally at 260, is provided with hinges 261 and strut assemblies 262, shelf supports 263 and 264, pocket storage areas 265 and 266, a safety reflector 267 and a fuel filler assembly 268. FIG. 25 illustrates a back view of assembly 268 showing the fuel filler neck seal/housing 269, while FIG. 26 illustrates a front view of the assembly 268 showing the fuel filler neck seal retainer 270 and filler closure member 271. As seen in FIG. 27, a hinged side panel module 272 covers the opening in storage box module 260, and includes a fuel filler flap 273 controlled by key slot 274 to enable access to the fuel filler closure member 271 of fuel filler assembly 258 of FIG. 24. Skirt assemblies 275 and 276 are fixedly secured to storage box module 260, as shown in FIG. 24 and described above with respect to FIGS. 14–15, but if desired the skirts may be included with the hinged side panel module 272.

It has thus been shown that the present invention provides a hidden storage arrangement that can be initially built by modular assembly, into a pickup truck bed, for example, without altering the external appearance of the bed and without a significant reduction in the carrying capacity of the bed. While the invention has been described, for example, with respect to fleetside and stepside pickup beds, it can be readily incorporated into other types of pickup beds, such as the mid-size and compact, as well as in trailers or full-sized truck beds having side panels without detracting from the appearance of the side panels, except for any vertical or horizontal cuts therein. Also, the hinged side panel or fender/side panel can be hinged whereby the entire side panel, including the tail light section, can be raised and lowered to eliminate the vertical cut lines. In addition, only sections of the side panel may be hinged to enable horizontal or vertical movement, or the side panel can be hinged in sections which would require a vertical cut to allow one section to be opened. Also, the entire side panel or sections can be hinged so as to be lowered rather than raised, whereby the side panel can function as a work bench. If desired, the top rail of the bed to which the hinges are mounted may be reinforced to resist bending, such as by a resistive longer metal bend or a series of metal bends comprising a structural element. The modular assemblies comprising the hidden storage bed may be fabricated so that all modules except the side panel modules are common to all beds, and thus only the contour of the side panel modules need be fabricated to provide the desired design configuration of the bed.

While specific embodiments of the storage system fabrication and/or assembly methods, along with modifications thereto of the present invention have been described and/or illustrated, such are not intended to limit the invention. For certain applications, only one storage box or plural storage boxes on one side may be desired. Beds for pickups, trailers, and trucks are designed with differently constructed side panels and frame/undercarriage arrangements. For example, the bed 10 of FIG. 1 may extend downward to cover the frame or undercarriage, and thus the side panels 15 would include the skirt areas 13, or a cut, such as indicated at 20 and 21 in FIG. 1, which can be made along a desired lower portion of the side panels to eliminate the need for raising the entire side panel when the skirt area is part thereof.

While not shown, the hinged side panel sections may be coated on the inner surfaces thereof with insulating and/or sound absorbing materials utilized conventionally in the automotive industry. Also, if desired, the internal walls of the storage boxes may be coated with similar materials. In addition, though not shown, the edges of the side panels adjacent the hinged sections may be provided with seals similar to the conventional automotive trunk seals to prevent moisture and dust from entering the storage box when the hinged side panel sections are closed. Also, while the lock/latch mechanism is of a hidden type, not visible from an external view of the bed, the mechanism may include a keyed lock mounted in a hinged side panel section, and/or a handle assembly as shown in FIG. 5, but such would detract from the hidden aspect of the storage, and thus not be desirable.

Modifications and changes may become apparent to those skilled in the art, and it is intended that the invention be limited only by the scope of the appended claims.

What is claimed is:

1. A method for fabricating a modified conventional truck bed with a hidden storage area having a predetermined height, located entirely within the modified bed and intermediate modified side panels defining a width of the modified bed, without increasing the external width or height and without altering the external appearance of the side panels of the modified bed, when compared to that of a substantially identical conventional truck bed without any hidden storage area, comprising:

assembling components to form a floor assembly module, a bulkhead assembly module, a tailgate assembly module, two vertically extending structural support assembly modules, and two side storage/panel assembly modules, the assembling of the components into modules to include hinging at least one section of at least one side panel at least one of the side storage/panel assembly modules so as to move outwardly, assembling the modules together so that the bulkhead assembly module is mounted to the floor assembly module, then the two structural support assembly modules are mounted to at least the floor assembly module, then the two side storage/panel assembly modules are mounted to the two structural support assembly modules, and then the tailgate assembly module is mounted to the floor assembly module to produce the modified bed with a hidden storage area.

2. The method of claim 1, wherein assembling the components into modules additionally includes providing a storage box having an opening adjacent the at least one hinged section of the side panel.

3. The method of claim 2, wherein assembling the components into modules additionally includes providing the storage box with means forming at least one shelf/compartment.

4. The method of claim 1, wherein assembling the components into modules additionally includes providing an unexposed mechanism for at least releasably maintaining the hinged section of the side panel closed.

5. The method of claim 1, wherein the floor assembly is assembled from components including a plurality of collapsible support members extendiing thereacross and having collapsible sections.

6. The method of claim 5, wherein said two side storage/panel assemblies are assembled from components having openings therein into which ends of the collapsible sections of the support members extend.

7. The method of claim 6, wherein each of the two side storage/panel assemblies is assembled from components including at least one hinged side panel section.

8. The method of claim 6, wherein at least one of the two side storage/panel assemblies is assembled from components including a plurality of hinged side panel sections, said plurality of hinged side panel sections being assembled from components to enable movement of at least one of the side panel sections in an upward, downward or sideways direction.

9. The method of claim 6, wherein at least one of the two side storage/panel assemblies is assembled from components including a plurality of hinged side panel sections having ends which extend horizontally or vertically along a length of the side panel.

10. The method of claim 1, wherein at least one of the two side storage/panel assembly module is assembled from components including a storage box having an opening and one hinged side panel section adjacent said opening in the storage box and extending at least a length of nearly a full length of said one of said side storage/panel assembly modules.

11. The method of claim 1, additionally including manufacturing the components of the modules either individually or in modules containing a plurality of the individual components.

12. The method of claim 1, wherein the side storage/panel assembly modules are formed with contoured side panels.

13. The method of claim 1, wherein the two side storage/panel assembly modules are each formed of a storage box module and a side panel module having hinged section extending an entire length of side panel module.

14. The method of claim 1, wherein providing the two vertically extending structural support assembly modules is carried out by selection from the group consisting of a pair of support post assemblies adapted to be mounted to said floor module, a pair of interior side wall modules adapted to be mounted to at least said floor module, and a pair of structural support modules adapted to be mounted to a pair of vertical posts secured to said floor module and adapted to be at least mounted to said bulkhead module, and additionally providing a mechanism for assisting the hinged side panel section to open outwardly, and for at least assisting in maintaining the hinged side panel section closed.

15. A modular method for producing a modified conventional pickup truck bed having hidden storage in the side panels of the bed and located entirely within the modified bed and intermediate modified side panels defining a width and height of the modified bed without increasing the width or height of the bed and without changing the external contour of a conventional side panel bed, comprising:

forming a floor module, forming a bulkhead module, forming a tailgate module, forming two vertical structural support modules for attachment to the floor module, forming two storage box assembly structural support modules, forming two side panel modules having hidden storage in at least one, and having the external contour of a conventional side panel bed, forming of the two side panel modules being carried out so as to include a storage box assembly and at least one hinged side panel section, and assembling the formed modules into a truck bed having hidden storage without substantially altering the conventional external appearance of the side panels of the bed and without increasing the width or height of the bed when compared to an external appearance of a substantially identical bed having side panels without the hidden storage, assembly of the formed modules being carried out by attaching the bulkhead module to the floor module, attaching the two vertical structural support modules to at least the floor module, then attaching the two storage box assembly structural support modules to the two vertical structural support modules, attaching the two side panel modules to the storage box assembly structural support modules, and operatively attaching the tailgate module to at least the floor module.

16. The modular method of claim 15, wherein forming the floor module includes providing a plurality of collapsible support beams having collapsible end sections so as to extend across the bed and beneath the floor.

17. The modular method of claim 16, wherein forming the two side panel modules includes providing openings therein into which said collapsible end sections of the collapsible support beams extend.

18. The modular method of claim 15, wherein forming the at least one side panel module with hidden storage includes providing a storage box having an opening therein, hinging an external section of a side panel of the module located adjacent the storage box to expose the interior of the storage box, and providing a hidden mechanism for at least retaining the hinged section of the side panel closed.

19. The modular method of claim 18, wherein providing the storage box includes providing at least one shelf or compartment in the storage box, and wherein a side panel is provided with at least one storage pocket.

20. The modular method of claim 18, wherein hinging an external section of a side panel of the module is carried out to enable the hinged section to open downwardly, upwardly or sideways.

21. The modular method of claim 18, wherein providing the side panel module with a hinged external section additionally includes providing the hinged section with means for retaining same in open position, and providing a top rail on side panel module to which is hinged the hinged external section.

22. The modular method of claim 15, wherein the assembling of the two side panel modules is carried out by attaching the two storage box assembly structural support modules to the vertical support structure modules attached to the floor module.

23. The modular method of claim 15, additionally including forming a support bar, attaching the support bar to an upper surface of a storage box section of a side panel module, and hinging a side panel section of the side panel module to the support bar.

24. A method for producing a modified conventional contoured pickup truck bed with a hidden storage area having a predetermined height located entirely within the modified bed and intermediate modified side panels defining a width of the modified bed, the width, height and external appearance of the modified bed being the same as that of a substantially identical conventional contoured pickup truck bed without any hidden storage area, comprising:

providing a floor module,
providing a bulkhead module,
providing a tailgate module,
providing a pair of storage box modules,
providing a pair of side panel modules,
providing a pair of vertical structural support assemblies,
providing means on the storage box modules for hinging the side panel modules,
attaching the vertical structural support assemblies to the floor module and to the bulkhead module,
then attaching the storage box modules and the side panel modules to the vertical structural support assemblies forming a pickup truck bed wherein the side panel modules are hinged to enable uncovering and covering an adjacent side of the storage box modules.

25. The method of claim 24, additionally providing a pair of top bar assemblies, securing the top bar assemblies to the storage box modules, and hinging the side panel modules on the top bar assemblies.

26. The method of claim 24, wherein the tail gate module is mounted at each end to a storage box module.

27. The method of claim 24, additional including forming the side panel modules to include providing the tail light assemblies, and additionally including mechanisms for the side panel modules for at least retaining same in a closed position.

28. A modular method or fabricating a modified truck bed having hidden storage located entirely in and intermediate modified side panels defining a width of the modified bed, without increasing the width and without changing the external appearance of the modified bed, the width and external appearance being the same as that of a substantially identical conventional truck bed without any hidden storage therein, comprising:

providing a floor module,
providing a bulkhead module,
providing a tailgate module,
providing two vertical structural support modules,
providing two side panel modules having hidden storage area in at least one, and having an external appearance of conventional side panels,
providing at last one hinged side panel section in the at least one side panel module to open outwardly to expose an interior of the hidden storage area,
assembling the floor module, the bulkhead module, the tailgate module and the two vertical structural support modules to form a frame of a bed with the two vertical structural support modules being attached to the floor module and to the bulkhead module, and
then attaching the two side panel modules to the two vertical structural support modules of the thus assembled frame, and hinging the tailgate module to the floor module,
the assembling of the modules to form the frame of a bed and the attachment of the two side panel modules to the frame being carried out without substantially altering the conventional external appearance of the side panels of the bed and without increasing the width of the bed when compared to an external appearance and width of a substantially identical truck bed without the hidden storage.

* * * * *